United States Patent
Benevelli et al.

(10) Patent No.: US 10,343,729 B2
(45) Date of Patent: Jul. 9, 2019

(54) SUSPENSION SYSTEM FOR A WORK VEHICLE

(71) Applicant: CNH INDUSTRIAL AMERICA LLC, New Holland, PA (US)

(72) Inventors: Alessandro Benevelli, Albinea (IT); Francesco Paolini, Modena (IT); John William Cloud, Winfield, KS (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/722,322

(22) Filed: Oct. 2, 2017

(65) Prior Publication Data

US 2019/0100255 A1    Apr. 4, 2019

(51) Int. Cl.

| | | |
|---|---|---|
| *B62D 33/10* | (2006.01) | |
| *B62D 33/06* | (2006.01) | |
| *B60G 15/06* | (2006.01) | |
| *B60G 99/00* | (2010.01) | |
| *B60G 13/00* | (2006.01) | |

(52) U.S. Cl.
CPC ....... *B62D 33/0604* (2013.01); *B60G 13/003* (2013.01); *B60G 15/063* (2013.01); *B60G 99/002* (2013.01); *B60G 2300/02* (2013.01)

(58) Field of Classification Search
CPC .............. B62D 33/067; B62D 33/0604; B62D 33/0608; B62D 33/063
USPC .......................... 296/190.05, 190.06, 190.07
See application file for complete search history.

(56) References Cited

U.S. PATENT DOCUMENTS

| | | | |
|---|---|---|---|
| 3,944,017 A | 3/1976 | Foster | |
| 4,275,918 A * | 6/1981 | Franco | B62D 33/0604 180/89.12 |
| 4,452,329 A | 6/1984 | Stone et al. | |
| 7,331,627 B2 * | 2/2008 | Van Den Brink | B62D 33/0604 180/89.13 |
| 7,695,054 B2 | 4/2010 | Haeusler et al. | |

(Continued)

*Primary Examiner* — Dennis H Pedder
(74) *Attorney, Agent, or Firm* — Peter K. Zacharias; Patrick M. Sheldrake

(57) ABSTRACT

A suspension system for a work vehicle includes a rear suspension assembly that includes a first shock absorber assembly and a second shock absorber assembly, such that each of the first and second shock absorber assemblies has a first end that couples to a cab of the work vehicle and a second end that couples to a chassis of the work vehicle. The rear suspension assembly further includes a brace extending laterally between the first end of the first shock absorber assembly and the first end of the second shock absorber assembly relative to a direction of travel of the work vehicle, such that the first end of the first shock absorber assembly and the first end of the second shock absorber assembly are coupled to the brace. In addition, the rear suspension assembly includes a longitudinal tie rod oriented substantially longitudinally along the direction of travel of the work vehicle, such that the longitudinal tie rod has a first end rotatably coupled to the brace and a second end configured to rotatably couple to the chassis of the work vehicle. The first end of the first shock absorber assembly and the first end of the second shock absorber assembly decouple from the cab without decoupling the brace from the first end of the first shock absorber assembly and the first end of the second shock absorber assembly.

19 Claims, 12 Drawing Sheets

(56) References Cited

U.S. PATENT DOCUMENTS

| | | | |
|---|---|---|---|
| 8,807,633 B2 * | 8/2014 | Milburn | B62D 33/0604 |
| | | | 280/756 |
| 8,991,538 B2 | 3/2015 | Angelo et al. | |
| 9,283,993 B2 | 3/2016 | Rager et al. | |
| 2003/0146647 A1 * | 8/2003 | Leitner | B60G 99/004 |
| | | | 296/190.05 |
| 2014/0319876 A1 * | 10/2014 | Schauer | B62D 33/0608 |
| | | | 296/190.07 |

* cited by examiner

SUSPENSION SYSTEM FOR A WORK VEHICLE

BACKGROUND

The present disclosure relates generally to a suspension system for a work vehicle.

Certain work vehicles (e.g., tractors, harvesters, skid steers, etc.) include a cab configured to house an operator. To facilitate access to certain components of the work vehicle (e.g., the engine, transmission, etc.), the cab may rotate forwardly relative to a chassis of the work vehicle about a pivot joint. In addition, the work vehicle may include certain elements to reduce the transmission of energy from the chassis to the cab. For example, the pivot joint may include a bushing (e.g., rubber bushing, polyurethane bushing, etc.) to reduce the transmission of energy to a front portion of the cab. In addition, an isolator (e.g., rubber isolator, polyurethane isolator, etc.) may be disposed between the cab and the chassis proximate to a rear portion of the cab to reduce the transmission of energy to the rear portion of the cab. However, due to the limited deformation of the bushing and the isolator, a significant portion of energy (e.g., associated with high-amplitude movement/vibrations experienced by the chassis) may be transmitted to the cab, thereby negatively affecting comfort of the operator.

BRIEF DESCRIPTION

In one embodiment, a suspension system for a work vehicle includes a rear suspension assembly that includes a first shock absorber assembly and a second shock absorber assembly, such that each of the first and second shock absorber assemblies has a first end that couples to a cab of the work vehicle and a second end that couples to a chassis of the work vehicle. The rear suspension assembly further includes a brace extending laterally between the first end of the first shock absorber assembly and the first end of the second shock absorber assembly relative to a direction of travel of the work vehicle, such that the first end of the first shock absorber assembly and the first end of the second shock absorber assembly are coupled to the brace. In addition, the rear suspension assembly includes a longitudinal tie rod oriented substantially longitudinally along the direction of travel of the work vehicle, such that the longitudinal tie rod has a first end rotatably coupled to the brace and a second end rotatably coupled to the chassis of the work vehicle. The first end of the first shock absorber assembly and the first end of the second shock absorber assembly decouple from the cab without decoupling the brace from the first end of the first shock absorber assembly and the first end of the second shock absorber assembly.

In another embodiment, a suspension system for a work vehicle includes a rear suspension assembly, such that the rear suspension assembly includes a first shock absorber assembly and a second shock absorber assembly, such that each of the first and second shock absorber assemblies has a first end that couples to a cab of the work vehicle and a second end that couples to a chassis of the work vehicle. Furthermore, the rear suspension assembly includes a brace extending laterally between the first end of the first shock absorber assembly and the first end of the second shock absorber assembly relative to a direction of travel of the work vehicle, such that the first end of the first shock absorber assembly and the first end of the second shock absorber assembly are coupled to the brace. In addition, the rear suspension assembly includes a lateral tie rod oriented substantially laterally relative to the direction of travel of the work vehicle, such that the lateral tie rod has a first end that rotatably couples to the chassis of the work vehicle and a second end that rotatably couples to the brace. The first end of the first shock absorber assembly and the first end of the second shock absorber assembly are decoupled from the cab without decoupling the brace from the first end of the first shock absorber assembly and the first end of the second shock absorber assembly.

In a further embodiment, a suspension system for a work vehicle includes a rear suspension assembly. The rear suspension assembly includes a first shock absorber assembly and a second shock absorber assembly, such that each of the first and second shock absorber assemblies has a first end that couples to a cab of the work vehicle and a second end that couples to a chassis of the work vehicle. Furthermore, the rear suspension assembly includes a brace extending laterally between the first end of the first shock absorber assembly and the first end of the second shock absorber assembly relative to a direction of travel of the work vehicle, such that the first end of the first shock absorber assembly and the first end of the second shock absorber assembly are coupled to the brace. Additionally, the rear suspension assembly includes a lateral tie rod oriented substantially laterally relative to the direction of travel of the work vehicle, such that the lateral tie rod has a first end rotatably coupled to the chassis of the work vehicle and a second end rotatably coupled to the brace and a longitudinal tie rod oriented substantially longitudinally along the direction of travel of the work vehicle, such that the longitudinal tie rod has a first end rotatably coupled to the cab of the work vehicle and a second end rotatably coupled to the chassis of the work vehicle. The first end of the first shock absorber assembly and the first end of the second shock absorber assembly decouple from the cab without decoupling the brace from the first end of the first shock absorber assembly and the first end of the second shock absorber assembly.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
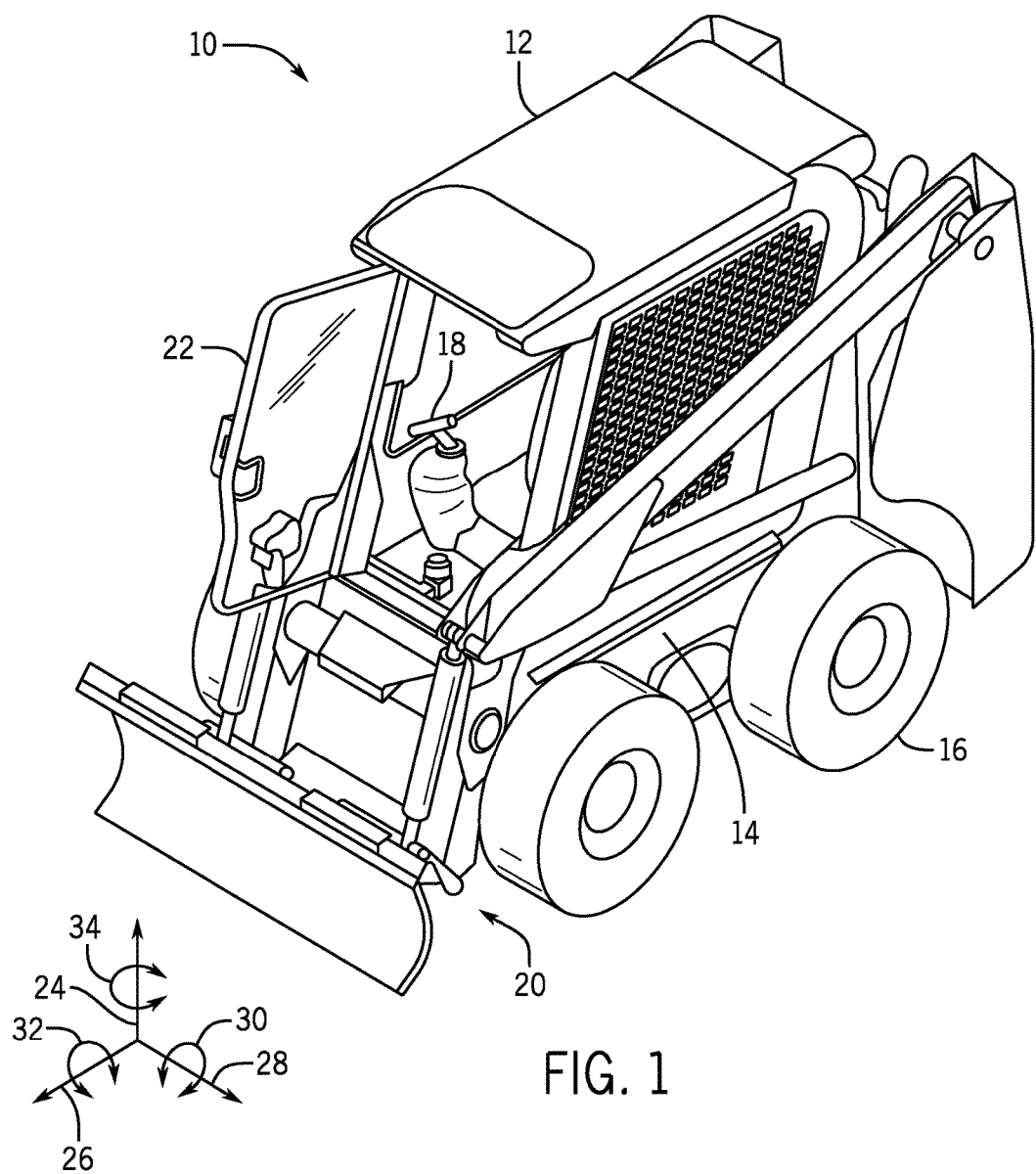
FIG. 1 is a perspective view of an embodiment of a work vehicle that may include a suspension system.

Turning to the drawings, FIG. 1 is a perspective view of an embodiment of a work vehicle 10 that may include a suspension system. In the illustrated embodiment, the work vehicle 10 is a skid steer. However, it should be appreciated that the suspension system disclosed herein may be utilized on other work vehicles, such as on-road trucks, tractors, harvesters, and construction equipment, among other work vehicles. In the illustrated embodiment, the work vehicle 10 includes a cab 12 and a chassis 14. In certain embodiments, the chassis 14 is configured to house a motor (e.g., diesel engine, etc.), a hydraulic system (e.g., including a pump, valves, reservoir, etc.), and other components (e.g., an electrical system, a cooling system, etc.) that facilitate operation of the work vehicle. In addition, the chassis 14 is configured to support the cab 12 and wheels 16. The wheels 16 may be driven to rotate by the motor and/or by component(s) of the hydraulic system (e.g., hydraulic motor(s), etc.). While the illustrated work vehicle 10 includes wheels 16, it should be appreciated that in alternative embodiments, the work vehicle may include tracks or a combination of wheels and tracks.

The cab 12 is configured to house an operator of the work vehicle 10. Accordingly, various controls, such as the illustrated hand controller 18, are positioned within the cab 12 to facilitate operator control of the work vehicle 10. For example, the controls may enable the operator to control rotational speed of the wheels 16, thereby facilitating adjustment the speed and/or direction of the work vehicle 10. In addition, the controls may facilitate operator control of an implement, such as the illustrated blade 20. In the illustrated embodiment, the cab 12 also includes a door 22 to facilitate ingress and egress of the operator from the cab 12.

As discussed in detail below, the work vehicle 10 may include a suspension system configured to absorb energy (e.g., associated with movement/vibrations experienced by the chassis), thereby enhancing operator comfort. For example, the suspension system may enable the cab 12 to move relative to the chassis 14 along a vertical axis 24 of the work vehicle 10, while damping energy associated with the movement. In addition, the suspension system may be configured to substantially reduce movement of the cab 12 relative to the chassis 14 along a longitudinal axis 26 of the work vehicle 10 and along a lateral axis 28 of the work vehicle 10. The suspension system may also substantially reduce rotation of the cab 12 relative to the chassis 14 about the lateral axis 28 in pitch 30, about the longitudinal axis 26 in roll 32, and about the vertical axis 24 in yaw 34. Controlling movement of the cab 12 relative to the chassis 14 may enhance the comfort of the operator.

Figure 2:
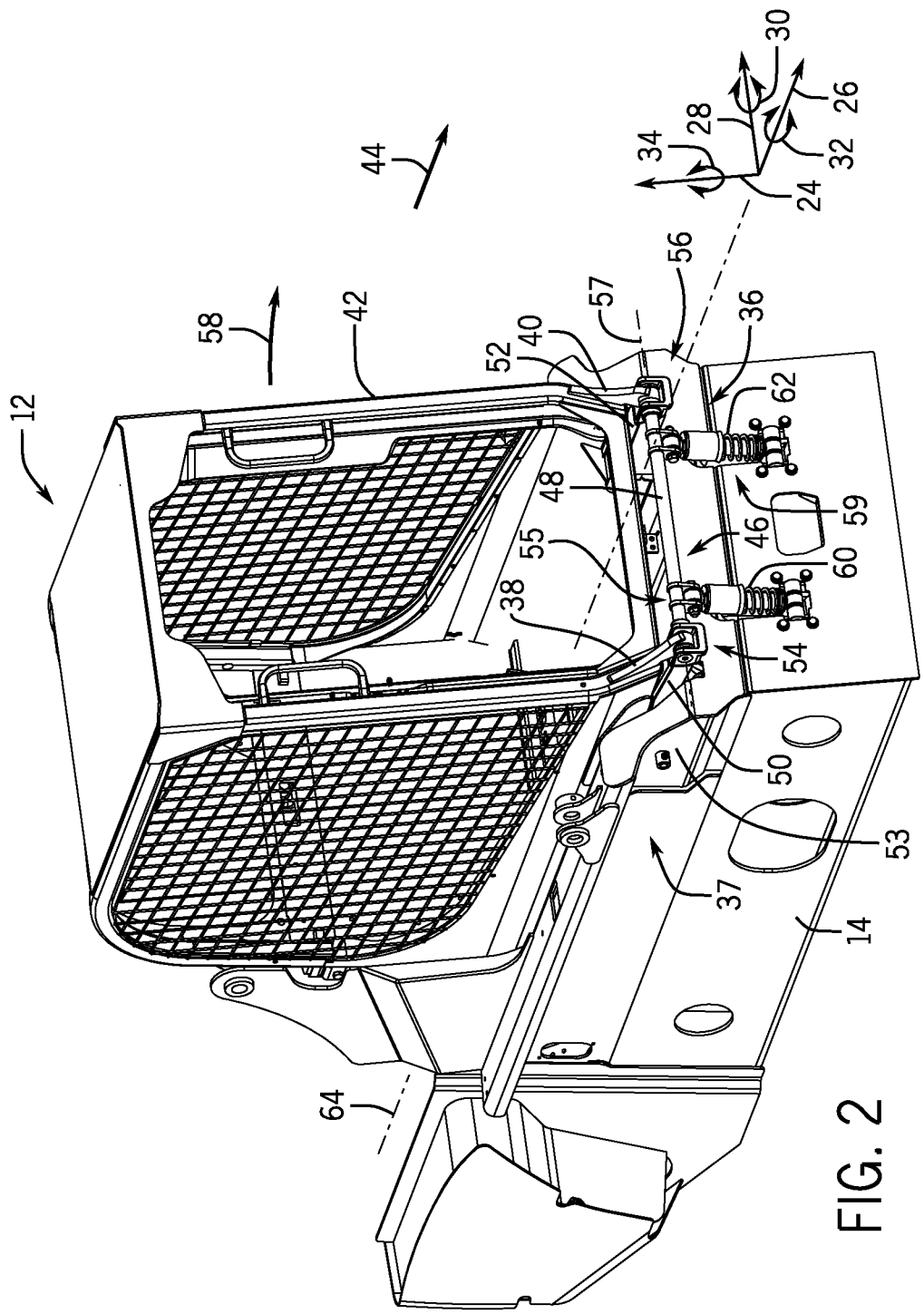
FIG. 2 is a perspective view of an embodiment of a front suspension assembly of a suspension system that may be employed within the work vehicle of FIG. 1.

FIG. 2 is a perspective view of an embodiment of a front suspension assembly 36 of a suspension system 37 that may be employed within the work vehicle of FIG. 1. In certain embodiments, the suspension system 37 also includes a rear suspension assembly. In the illustrated embodiments, the front suspension assembly 36 includes a first bracket 38 and a second bracket 40. Each bracket is fixedly coupled to a frame 42 of the cab 12 (e.g., via a welded connection, via an adhesive connection, via fasteners, etc.). As discussed in detail below, each bracket extends forwardly from a front face of the frame 42 relative to a direction of travel 44 of the work vehicle (e.g., along the longitudinal axis 26). While the illustrated front suspension assembly 36 includes two brackets, it should be appreciated that in alternative embodiments, the front suspension assembly may include more or fewer brackets (e.g., 1, 2, 3, 4, 5, 6, or more).

In the illustrated embodiment, the front suspension assembly 36 also includes a support element 46 having a torsion bar 48 and a pair of longitudinal supports, such as the illustrated first longitudinal support 50 and the second longitudinal support 52. As illustrated, the torsion bar 48 extends between the pair of longitudinal supports substantially along the lateral axis 28. The first longitudinal support 50 and the second longitudinal support 52 are each rotatably coupled to the chassis 14 of the work vehicle. In the illustrated embodiment, each of the longitudinal supports is positioned laterally inward from a laterally outward surface 53 of the chassis 14. Accordingly, the longitudinal supports may be separated from other moving parts of the work vehicle and/or a compact front suspension assembly may be formed. However, it should be appreciated that in alternative embodiments, at least one of the longitudinal supports may be positioned laterally outward from the outer surface of the chassis.

In the illustrated embodiment, the first bracket 38 is rotatably coupled to the support element 46 at a first pivot joint 54 of a pivot joint assembly 55, and the second bracket 40 is rotatably coupled to the support element 46 at a second pivot joint 56 of the pivot joint assembly 55. The brackets enable the pivot joints to be positioned forward of the cab 12 relative to the direction of travel 44, thereby enabling the cab to be tilted forwardly about a rotation axis 57 in the direction 58 from the illustrated working position to a maintenance position that facilitates access to components housed within (or coupled to) the chassis, such as the motor (e.g., diesel engine, etc.), the hydraulic system (e.g., including a pump, valves, reservoir, etc.), and other components (e.g., an electrical system, a cooling system, etc.). While the illustrated pivot joint assembly includes two pivot joints, it should be appreciated that alternative embodiments may include more or fewer pivot joints (e.g., corresponding to the number of brackets coupled to the chassis).

Because the pivot joints position the rotation axis 57 forward of the cab 12 relative to the direction of travel 44, the cab 12 may be pivoted farther in the direction 58 than a cab configured to rotate about a rotation axis that is positioned underneath the cab (e.g., below the cab and within the longitudinal extent of the cab), thereby increasing access to the components housed within the chassis. Furthermore, positioning the pivot joints forward of the cab 12 relative to the direction of travel 44 enables the height of the work vehicle to be reduced, as compared to a work vehicle having a cab configured to pivot about a rotation axis that is positioned underneath the cab (e.g., below the cab and within the longitudinal extent of the cab). In addition, positioning the pivot joints forward of the cab 12 may enable the size of the operator foot well to be increased, as compared to positioning the pivot joints underneath the cab (e.g., in a location that is otherwise occupied by the foot well), thereby enhancing occupant comfort.

Furthermore, the front suspension assembly 36 includes a damping assembly 59 having a front right (e.g., first) shock absorber 60 and a front left (e.g., second) shock absorber 62.

In the illustrated embodiment, the front right shock absorber 60 is on an opposite side of a longitudinal centerline 64 of the work vehicle from the front left shock absorber 62. However, it should be appreciated that in alternative embodiments, the shock absorbers may be positioned at other locations on the support element. Furthermore, while the illustrated damping assembly includes two shock absorbers, it should be appreciated that in alternative embodiments, the damping assembly may include more or fewer shock absorbers.

In the illustrated embodiment, each shock absorber is coupled to the support element 46 and to the chassis 14. The shock absorbers are configured to absorb energy (e.g., associated with movement/vibrations experienced by the chassis 14), thereby reducing the transmission of energy from the chassis to the cab. For example, the shock absorbers may reduce energy transfer along the vertical axis 24, about the longitudinal axis 26 in roll 32, about the lateral axis 28 in pitch 30, or a combination thereof. In addition, the support element 46 may substantially reduce movement of the cab relative to the chassis along the longitudinal axis 26, along the lateral axis 28, about the vertical axis 24 in yaw 34, or a combination thereof. As a result of the shock absorbers and the support element, the front suspension assembly may significantly increase operator comfort, as compared to work vehicles that only include a bushing at the pivot joint(s) to reduce energy transfer. In addition, combining the front suspension assembly with the pivot joints may reduce the cost, complexity, size, or a combination thereof, of the work vehicle (e.g., as compared to a work vehicle that includes a separate front suspension assembly and pivot joint(s)).

Figure 3:
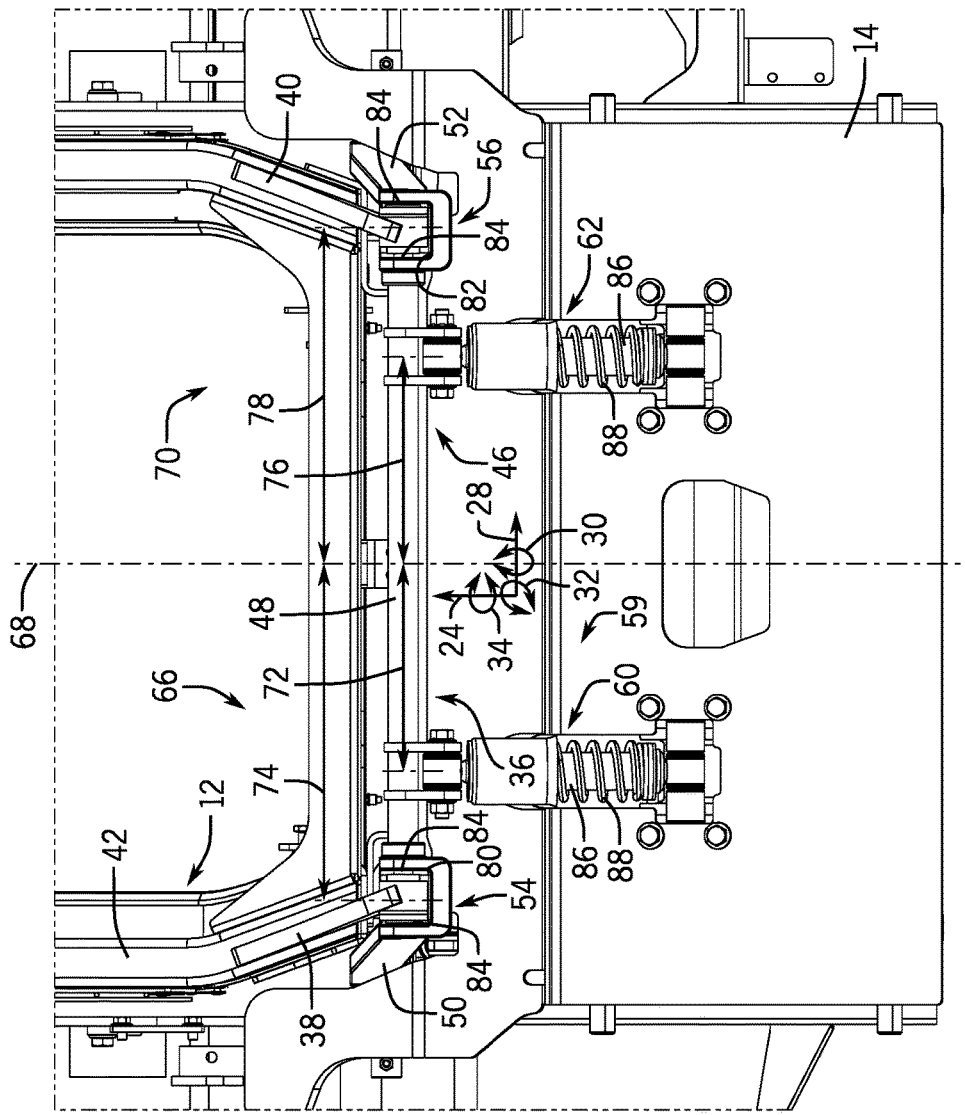
FIG. 3 is a front view of the front suspension assembly of FIG. 2.

FIG. 3 is a front view of the front suspension assembly 36 of FIG. 2. As illustrated, the first bracket 38 is positioned on a first lateral side 66 of a vertical centerline 68 of the work vehicle, and the second bracket 40 is positioned on a second lateral side 70 of the vertical centerline 68, opposite the first lateral side 66. As previously discussed, the first bracket 38 is rotatably coupled to the support element 46 at the first pivot joint 54, and the second bracket 40 is rotatably coupled to the support element 46 at the second pivot joint 56. The front right shock absorber 60 is positioned closer to the vertical centerline 68 than the first pivot joint 54. Accordingly, a first lateral distance 72 (e.g., distance along the lateral axis 28) between the front right shock absorber 60 and the vertical centerline 68 is less than a second lateral distance 74 (e.g., distance along the lateral axis 28) between the first pivot joint 54 and the vertical centerline 68. In addition, the front left shock absorber 62 is positioned closer to the vertical centerline 68 than the second pivot joint 56. Accordingly, a third lateral distance 76 (e.g., distance along the lateral axis 28) between the front left shock absorber 62 and the vertical centerline 68 is less than a fourth lateral distance 78 (e.g., distance along the lateral axis 28) between the second pivot joint 56 and the vertical centerline 68. As a result of this configuration, the pivot joints and brackets are positioned laterally outward from the shock absorbers relative to the vertical centerline 68, thereby increasing stability of the cab during rotation about the pivot joints between the working position and the maintenance position.

In the illustrated embodiment, the support element includes a first recess 80 configured to receive the first bracket 38 and a second recess 82 configured to receive the second bracket 40. The first pivot joint 54 is formed within the first recess 80, and the second pivot joint 56 is formed within the second recess 82. Contact between each bracket and lateral side walls 84 of the respective recess (e.g., via bushing(s) and/or bearing(s) coupled to the bracket and/or the support element) may substantially reduce movement of the cab relative to the support element along the lateral axis 28, thereby increasing the stability of the cab during rotation about the pivot joints and/or during operation of the work vehicle. While the pivot joints are formed within the respective recesses in the illustrated embodiment, it should be appreciated that in alternative embodiments, the pivot joints may be formed on other portions of the support element (e.g., on the torsion bar, etc.). Furthermore, while the support element includes two recesses in the illustrated embodiment, it should be appreciated that in alternative embodiments, the support element may include more or fewer recesses (e.g., corresponding to the number of brackets extending from the frame of the cab).

In the illustrated embodiment, each shock absorber includes a damper 86 (e.g., a viscous/hydraulic damper, an eddy current damper, etc.) and a spring 88. The combination of the damper 86 and the spring 88 is configured to absorb energy (e.g., associated with vibration/movement experienced by the chassis), thereby reducing the transmission of energy from the chassis to the cab. While each shock absorber includes a damper and a spring in the illustrated embodiment, it should be appreciated that in alternative embodiments, at least one shock absorber may only include a spring or a damper. In addition, in certain embodiments, each shock absorber may include another device (e.g., alone or in combination with other device(s), such as the spring and/or damper) configured to absorb energy (e.g., associated with vibration/movement experienced by the chassis). For example, at least one shock absorber may include a hydraulic piston, an air bag, a pneumatic piston, or a combination thereof, among other shock absorbing devices. In certain embodiments, the energy absorbing characteristics of each shock absorber (e.g., compression/extension of the shock absorber under load, etc.) may be adjusted by controlling the fluid pressure within the shock absorbing device(s) (e.g., hydraulic cylinder, air bag, pneumatic piston, etc.) to achieve the desired operator comfort. In certain embodiments, at least one shock absorber may include internal stop(s) configured to limit the compression and/or expansion of the shock absorber, thereby controlling movement of the cab relative to the chassis. The internal stop(s) may be adjustable based on a desired magnitude of compression and/or expansion of the shock absorber.

Figure 4:
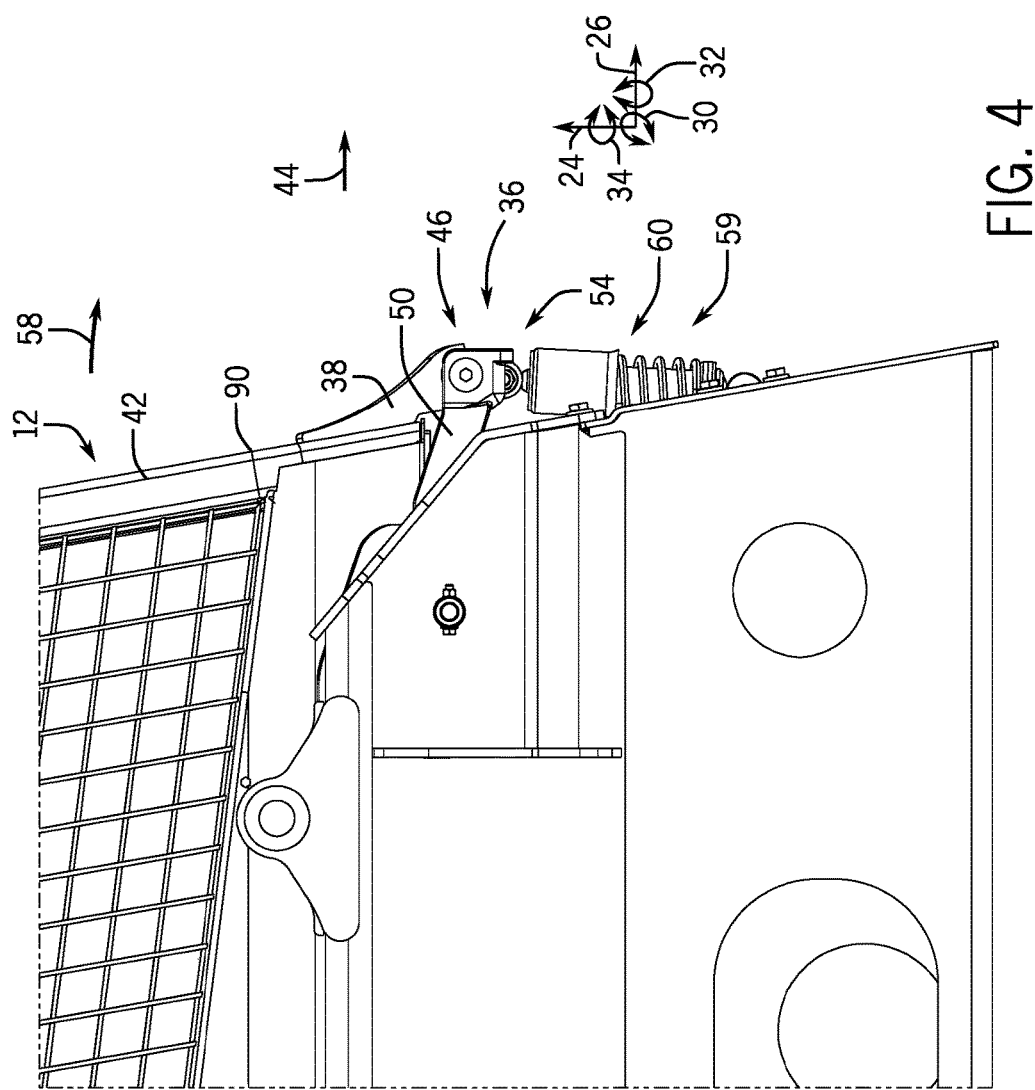
FIG. 4 is a side view of the front suspension assembly of FIG. 2.

FIG. 4 is a side view of the front suspension assembly 36 of FIG. 2. As illustrated, the first bracket 38 extends forwardly from a front face 90 of the frame 42 of the cab 12 relative to the direction of travel 44. Accordingly, the first bracket 38 is positioned forward of the front face 90 of the frame 42 along the longitudinal axis 26 in the direction of travel 44. In the illustrated embodiment, the front face 90 of the frame 42 extends substantially along the vertical axis 24 and substantially along the lateral axis of the work vehicle. As previously discussed, the first bracket 38 may be coupled to the front face 90 of the frame 42 by a welded connection, an adhesive connection, fasteners, or a combination thereof, among other connections.

Furthermore, the second bracket also extends forwardly from the front face of the frame of the cab relative to the direction of travel (e.g., the first bracket extends from a front face of a first vertical support of the frame, and the second bracket extends from a front face of a second vertical support of the frame). Positioning the brackets forward of the front face of the frame enables the pivot joints to be positioned forward of the cab relative to the direction of travel, thereby enabling the cab to be tilted farther in the direction 58 than a cab configured to rotate about pivot joints that are positioned underneath the cab (e.g., below the cab and within the longitudinal extent of the cab).

Figure 5:
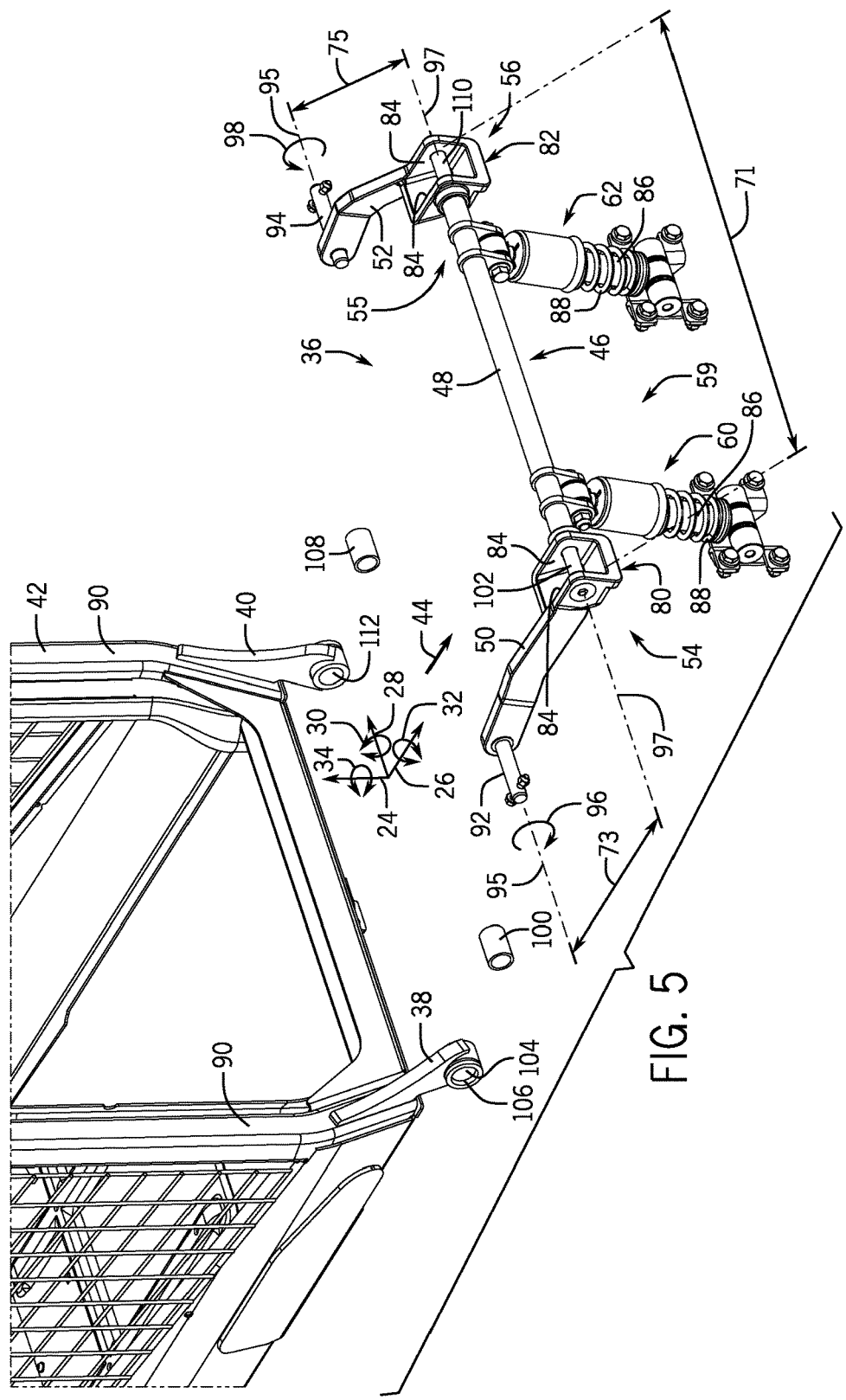
FIG. 5 is an exploded view of the front suspension assembly of FIG. 2.

FIG. 5 is an exploded view of the front suspension assembly 36 of FIG. 2. In the illustrated embodiment, the first longitudinal support 50 is rotatably coupled to the chassis of the work vehicle by a first axle 92, and the second longitudinal support 52 is rotatably coupled to the chassis of the work vehicle by a second axle 94. In the illustrated embodiment, a distance 71 between the first longitudinal support 50 and the second longitudinal support 52 may be configured to be of any suitable distance. In some embodiments the length of the torsion bar 48 may be equal to the distance 71 The axles enable the support element 46 to rotate about a rotation axis 95 (e.g., parallel to the lateral axis 28) relative to the chassis. The shock absorbers are configured to absorb rotational energy associated with movement/vibrations of the support element 46 about the rotation axis 95. For example, when the work vehicle (e.g., at least one front wheel of the work vehicle) encounters a protrusion on the ground (e.g., bump, ridge, etc.), the front of the cab may be urged downwardly relative to the chassis, thereby inducing the support element 46 to rotate about the rotation axis 95 in a downward direction 96. As the support element 46 rotates in the downward direction 96, the shock absorbers may compress and absorb energy. As a result, the energy transfer between the chassis and the cab may be reduced, thereby enhancing passenger comfort. In addition, when the work vehicle (e.g., at least one front wheel of the work vehicle) encounters a recess in the ground (e.g., trench, divot, etc.), the front of the cab may be urged upwardly relative to the chassis, thereby inducing the support element 46 to rotate about the rotation axis 95 in an upward direction 98. As the support element 46 rotates in the upward direction 98, the shock absorbers may expand and absorb energy. As a result, the energy transfer between the chassis and the cab may be reduced, thereby enhancing passenger comfort.

As previously discussed, the brackets are coupled to the support element 46 by pivot joints. In the illustrated embodiment, the first pivot joint 54 includes a bushing 100. The bushing 100 is disposed about a shaft 102 of the support element 46, and the bushing 100 is disposed within an opening 104 of the first bracket 38. Accordingly, the bushing 100 is disposed between the first bracket 38 and the support element 46. The bushing 100 is formed from a resilient material (e.g., rubber, polyurethane, etc.) and is configured to absorb energy associated with movement (e.g., vibration) of the chassis, thereby reducing energy transfer from the chassis to the cab. In the illustrated embodiment, the first pivot joint 54 includes a bearing 106 disposed about the shaft 102 and configured to facilitate rotation of the cab about the first pivot joint 54.

Similar to the first pivot joint 54, the second pivot joint 56 includes a bushing 108 disposed about a shaft 110 of the support element 46. In addition, the bushing 108 is disposed within an opening 112 of the second bracket 40. Accordingly, the bushing 108 is disposed between the second bracket 40 and the support element 46. The bushing 108 is also formed from a resilient material (e.g., rubber, polyurethane, etc.) and is configured to absorb energy associated with movement (e.g., vibration) of the chassis, thereby reducing energy transfer from the chassis to the cab. While each pivot joint includes a bushing in the illustrated embodiment, it should be appreciated that in alternative embodiments, at least one of the bushings may be omitted and/or at least one of the bushings may be formed from a substantially rigid material.

Figure 6:
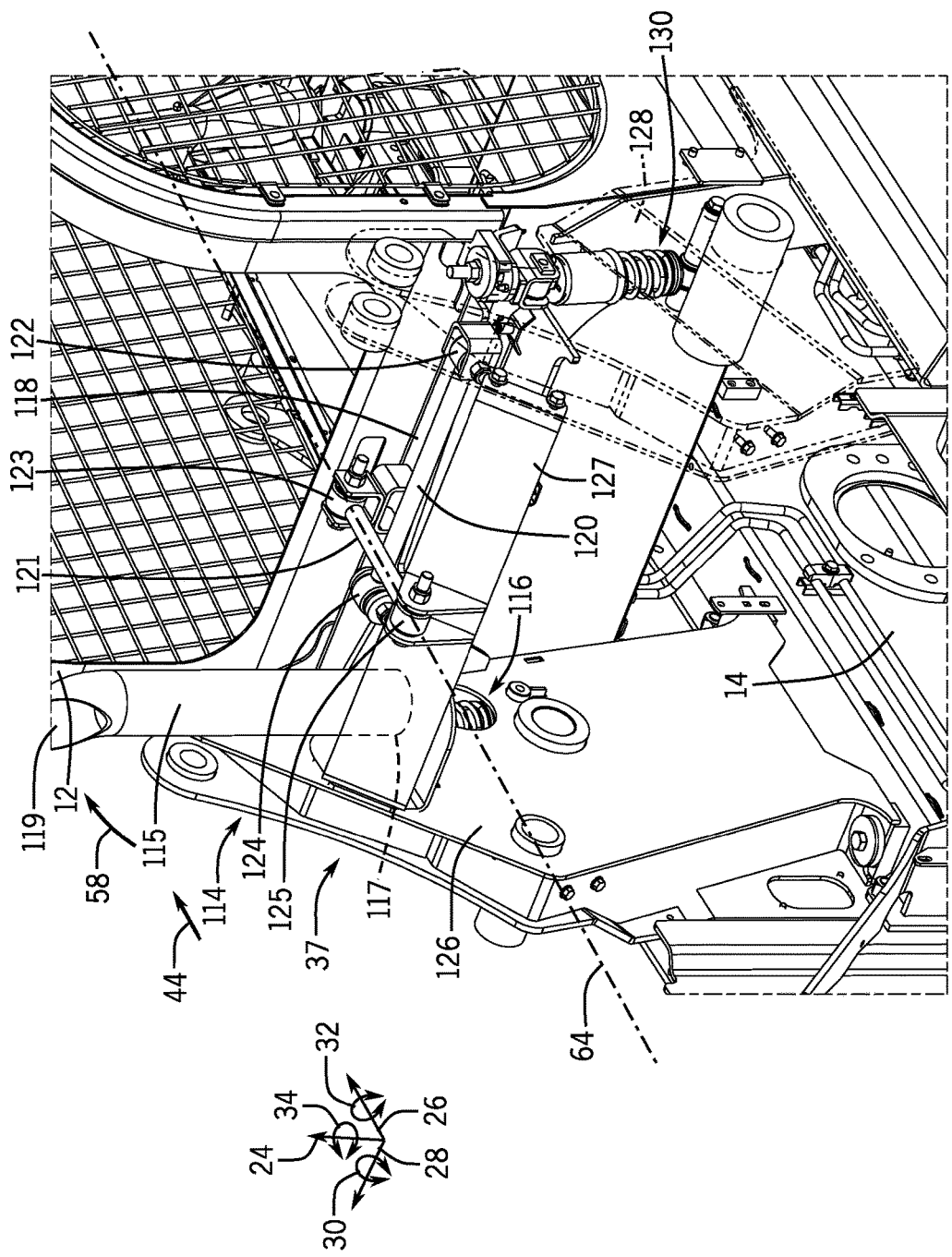
FIG. 6 is a perspective view of an embodiment of a rear suspension assembly of a suspension system that may be employed within the work vehicle of FIG. 1.

FIG. 6 is a perspective view of an embodiment of a rear suspension assembly 114 of a suspension system 37 that may be employed within the work vehicle of FIG. 1. As discussed in detail below, the rear suspension assembly 114 includes a rear left (e.g., first) shock absorber assembly 116 and a rear right (e.g., second) shock absorber assembly 130. Each shock absorber assembly has a top (e.g., first) end configured to be coupled to the cab 12 of the work vehicle and a bottom (e.g., second) end coupled to the chassis 14 of the work vehicle. In addition, the rear suspension assembly 114 includes a brace 118 extending along the lateral axis 28 (e.g., lateral relative to the direction of travel 44) between the top end of the rear left shock absorber assembly 116 and the top end of the rear right shock absorber assembly 130. Furthermore, in the illustrated embodiment, an exhaust pipe 115 is configured to direct the flow of exhaust gases from the engine of the work vehicle out through an opening on the second end 119 of the exhaust pipe. Furthermore, in the illustrated embodiment, the exhaust pipe is oriented along the vertical axis 24 and defines a flow path for exhaust gases to be expelled from the exhaust pipe via the opening on the second end 119.

In addition, the rear suspension assembly 114 includes a lateral tie rod 120 substantially oriented along the lateral axis 28. The lateral tie rod 120 has a first end 122 rotatably coupled to the chassis 14 and a second end 124 rotatably coupled to the brace 118. The top end of the rear left shock absorber assembly 116 and the top end of the rear right shock absorber assembly 130 are configured to be decoupled from the cab 12 without decoupling the brace 118 from the top end of the rear left shock absorber assembly 116 and the top end of the rear right shock absorber assembly 130. Accordingly, the cab 12 may be decoupled from the rear suspension assembly 114 via removal of two fasteners that secure the cab 12 to the top ends of the respective shock absorber assemblies, thereby facilitating rotation of the cab 12 in the direction 58 from the illustrated working position to the maintenance position. While a single lateral tie rod is included In the illustrated embodiment, in further embodiments, the rear suspension assembly 114 may include any suitable number of lateral tie rods 120. For example, the rear suspension assembly may include 1, 2, 3, 4, 6 or any suitable number of lateral tie rods 120.

Furthermore, the rear suspension assembly 114 includes a longitudinal tie rod 121 substantially oriented along the longitudinal axis 26 (e.g., along the longitudinal centerline 64). The longitudinal tie rod 121 has a first end 123 rotatably coupled to the brace 118 and a second end 125 rotatably coupled to a support plate 127 of the chassis 14. In the illustrated embodiment, the support plate 127 laterally extends (e.g., along the lateral axis 28) between and is rigidly fixed to a first tower support 126 at a first end and rigidly fixed to a second tower support 128 at a second end. That is, the support plate 127 is configured to be coupled to the chassis 14. In alternative embodiments, the longitudinal tie rod 121 may be coupled to any other structure(s) of the chassis 14 (e.g., with the support plate omitted). For example, the longitudinal tie rod 121 may be coupled to a housing of the chassis. Furthermore, while a single longitudinal tie rod is included in the illustrated embodiment, in further embodiments, the rear suspension assembly 114 may include another suitable number of longitudinal tie rods 121. For example, the rear suspension assembly may include 1, 2, 3, 4, or any suitable number of longitudinal tie rods 121. Furthermore, although the illustrated embodiment includes the lateral tie rod 120 and the longitudinal tie rod 121 perpendicular to one another, in some embodiments, the angle between the lateral tie rod 120 and the longitudinal tie rod may be about 60 degrees, 75 degrees, 90 degrees, 105 degrees, 120 degrees, or any suitable angle or ranges of angles. For example, the angle between the lateral tie rod 120 and the longitudinal tie rod 121 may be between 60 and 75 degrees, 75 and 90 degrees, 90 and 105 degrees, and the like. In alternative embodiments, either the lateral tie rod 120 or the longitudinal tie rod 121 may be omitted from the rear suspension assembly.

In the illustrated embodiment, the rear left shock absorber assembly 116 is disposed within the first tower support 126 of the chassis 14, and the rear right shock absorber assembly is disposed within the second tower support 128 of the chassis 14. Disposing the shock absorber assemblies within the respective tower supports may shield the shock absorber assemblies from the environment surrounding the work vehicle and/or substantially reduce or eliminate the possibility of interference between the shock absorber assemblies and a moving component of the work vehicle. However, it should be appreciated that in alternative embodiments, the shock absorber assemblies may be positioned in any suitable location on the work vehicle. In addition, while the rear suspension assembly 114 includes two shock absorber assemblies in the illustrated embodiment, it should be appreciated that in alternative embodiments, the rear suspension assembly may include more or fewer shock absorber assemblies (e.g., 1, 2, 3, 4, 5, 6, or more).

Figure 7:
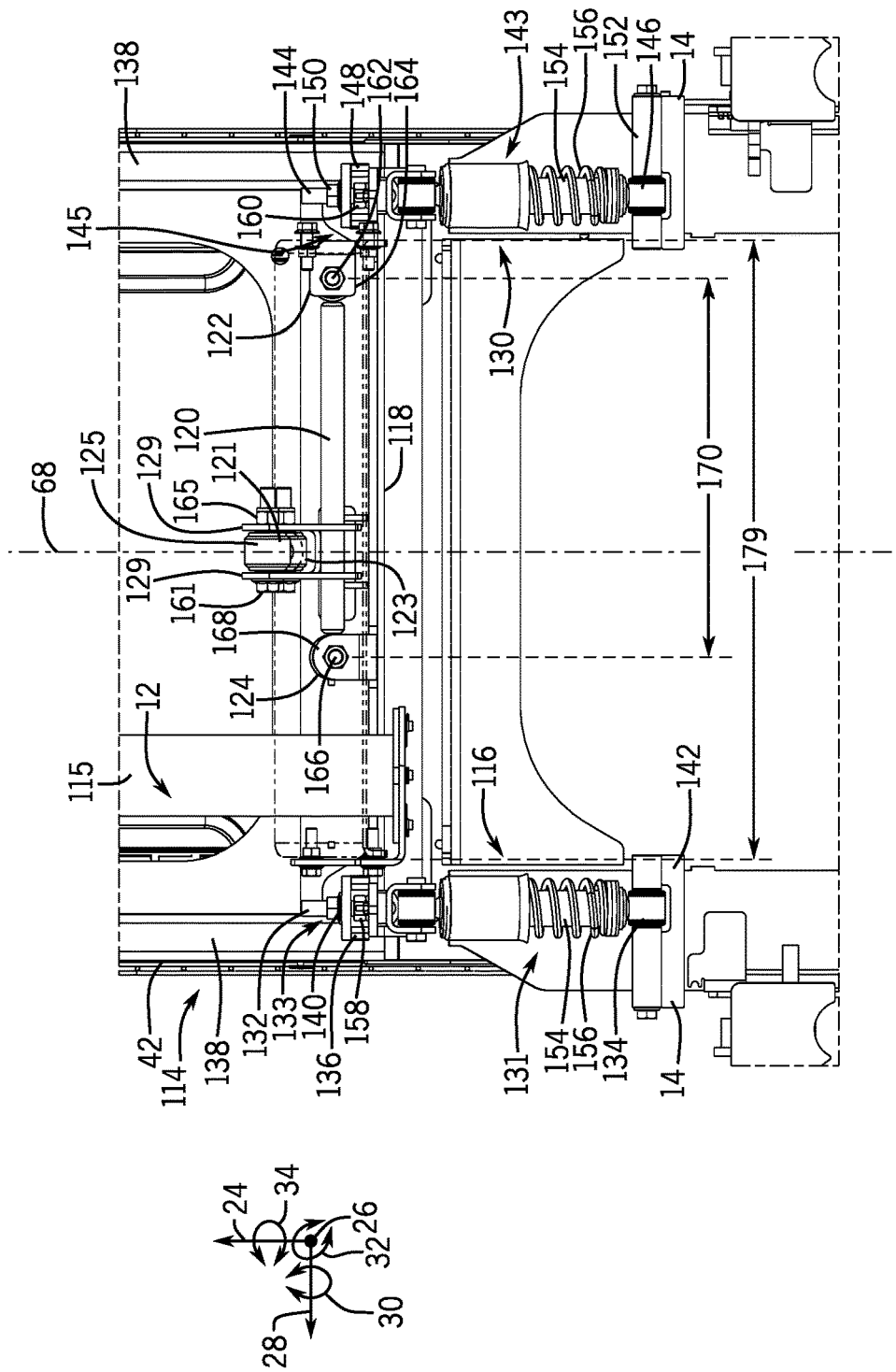
FIG. 7 is a rear view of the rear suspension assembly of FIG. 6.

FIG. 7 is a rear view of the rear suspension assembly 114 of FIG. 6. As previously discussed, the rear suspension assembly 114 includes the rear left shock absorber assembly 116 and the rear right shock absorber assembly 130. In the illustrated embodiment, the rear left shock absorber assembly 116 includes a shock absorber 131 and a mounting assembly 133. The shock absorber 131 is configured to absorb energy (e.g., associated with vibration/movement experienced by the chassis 14), and the mounting assembly 133 is configured to selectively secure the shock absorber 131 to the cab 12. A top (e.g., first) end 132 of the rear left shock absorber assembly 116 (e.g., a top end of the mounting assembly) is configured to couple to the cab 12, and a bottom (e.g., second) end 134 of the rear left shock absorber assembly 116 (e.g., a bottom end of the shock absorber) is coupled to the chassis 14. In the illustrated embodiment, the top end 132 of the rear left shock absorber assembly 116 is selectively coupled to a first mount 136 extending from a rear face 138 of the frame 42 of the cab 12 by a first fastener 140. In certain embodiments, the top end 132 of the rear left shock absorber assembly 116 (e.g., the top end of the mounting assembly) is threaded, and the first fastener 140 is configured to engage the threads of the top end 132 to couple the rear left shock absorber assembly 116 to the cab 12. However, it should be appreciated that in alternative embodiments, the top end of the rear left shock absorber assembly may be selectively coupled to the cab by other fastening systems (e.g., a latch, a magnetic coupling, etc.). Furthermore, the bottom end 134 of the rear left shock absorber assembly 116 (e.g., the bottom end of the shock absorber) is pivotally coupled to a first support 142 of the chassis 14. The first support 142 may extend across the first tower support to secure the bottom end of the rear left shock absorber assembly to the chassis 14.

Furthermore, the rear right shock absorber assembly 130 includes a shock absorber 143 and a mounting assembly 145. The shock absorber 143 is configured to absorb energy (e.g., associated with vibration/movement experienced by the chassis), and the mounting assembly 145 is configured to selectively secure the shock absorber 143 to the cab 12. A top (e.g., first) end 144 of the rear right shock absorber assembly 130 (e.g., a top end of the mounting assembly) is configured to couple to the cab 12, and a bottom (e.g., second) end 146 of the rear right shock absorber assembly 130 (e.g., a bottom end of the shock absorber) is coupled to the chassis 14. In the illustrated embodiment, the top end 144 of the rear right shock absorber assembly 130 is selectively coupled to a second mount 148 extending from the rear face 138 of the frame 42 of the cab 12 by a second fastener 150. In certain embodiments, the top end 144 of the rear right shock absorber assembly 130 (e.g., the top end of the mounting assembly) is threaded, and the second fastener 150 is configured to engage the threads of the top end 144 to couple the rear right shock absorber assembly 130 to the cab 12. However, it should be appreciated that in alternative embodiments, the top end of the rear right shock absorber assembly may be selectively coupled to the cab by other fastening systems (e.g., a latch, a magnetic coupling, etc.). Furthermore, the bottom end 146 of the rear right shock absorber assembly 130 (e.g., the bottom end of the shock absorber) is pivotally coupled to a second support 152 of the chassis 14. The second support 152 may extend across the second tower support to secure the bottom end of the rear right shock absorber assembly to the chassis 14.

In the illustrated embodiment, the shock absorber of each shock absorber assembly includes a damper 154 (e.g., a viscous/hydraulic damper, an eddy current damper, etc.) and a spring 156. The combination of the damper 154 and the spring 156 is configured to absorb energy (e.g., associated with vibration/movement experienced by the chassis), thereby reducing the transmission of energy from the chassis 14 to the cab 12. While each shock absorber includes a damper and a spring in the illustrated embodiment, it should be appreciated that in alternative embodiments, at least one shock absorber may only include a spring or a damper. In addition, in certain embodiments, each shock absorber may include another device (e.g., alone or in combination with other device(s), such as the spring and/or damper) configured to absorb energy (e.g., associated with vibration/movement experienced by the chassis). For example, at least one shock absorber may include a hydraulic piston, an air bag, a pneumatic piston, or a combination thereof, among other shock absorbing devices. In certain embodiments, the energy absorbing characteristics of each shock absorber (e.g., compression/extension of the shock absorber under load, etc.) may be adjusted by controlling the fluid pressure within the shock absorbing device(s) (e.g., hydraulic cylinder, air bag, pneumatic piston, etc.) to achieve the desired operator comfort. In certain embodiments, at least one shock absorber may include internal stop(s) configured to limit the compression and/or expansion of the shock absorber, thereby controlling movement of the cab relative to the chassis. The internal stop(s) may be adjustable based on a desired magnitude of compression and/or expansion of the shock absorber.

As illustrated, the brace 118 extends along the lateral axis 28 between the top end 132 of the rear left shock absorber assembly 116 and the top end 144 of the rear right shock absorber assembly 130. The top end 132 of the rear left shock absorber assembly 116 (e.g., the top end of the mounting assembly) is coupled to the brace 118 by a third fastener 158, and the top end 144 of the rear right shock absorber assembly 130 (e.g., the top end of the mounting assembly) is coupled to the brace 118 by a fourth fastener 160. In certain embodiments, the top end of each shock absorber assembly is threaded, and the third and fourth fasteners are each configured to engage the threads of the respective top end to couple the respective shock absorber assembly to the brace. However, it should be appreciated that in alternative embodiments, the top end of each shock absorber assembly may be coupled to the brace by other fastening systems (e.g., a welded connection, an adhesive connection, etc.).

Furthermore, the lateral tie rod 120 extends between the chassis 14 and the brace 118. As illustrated, the first end 122 of the lateral tie rod 120 is rotatably coupled to the chassis 14, and the second end 124 of the lateral tie rod 120 is rotatably coupled to the brace 118. In the illustrated embodiment, the first end 122 of the lateral tie rod 120 is coupled via a fastener 162 to a mount 164 that extends from the second tower support of the chassis 14. However, in alternative embodiments, the first end of the lateral tie rod may be coupled to other portions of the chassis, and/or the first end of the lateral tie rod may be coupled to the chassis by other connection systems (e.g., a pin, etc.). Furthermore, the second end 124 of the lateral tie rod 120 is coupled via a fastener 166 to a tab 168 that extends from the brace 118. However, in alternative embodiments, the second end of the lateral tie rod may be coupled to other portions of the brace, and/or the second end of the lateral tie rod may be coupled to the brace by other connection systems (e.g., a pin, etc.). In the illustrated embodiment, a length 170 of the lateral tie rod 120 is fixed (e.g., the lateral tie rod 120 is a single segment). However, in alternative embodiments, the length of the lateral tie rod may be adjustable (e.g., via rotation of fasteners that coupe segments of the lateral tie rod to one another).

In the illustrated embodiment, the lateral tie rod 120 extends laterally (e.g., along the lateral axis 28) from an inward face of the second tower support 128 beyond the vertical centerline. The lateral tie rod 120 is positioned closer to the vertical centerline 68 than the rear right shock absorber assembly 130 along the lateral axis 28, and the lateral tie rod 120 is positioned closer to the vertical centerline 68 than the rear left shock absorber assembly 116 along the lateral axis 28. Accordingly, the lateral tie rod 120 is positioned substantially laterally inward from the rear right shock absorber assembly 130 and from the rear left shock absorber assembly 116. In the illustrated embodiment, the lateral tie rod includes a distance 170 that extends from the center of the first end 122 and the second end 124. In some embodiments, the lateral tie rod may have a shorter length, such that the lateral tie rod does not extend beyond the vertical centerline 68 from the second tower support. In some embodiments, the rear suspension assembly 114 may include a lateral tie rod that extends laterally outward beyond the rear left shock absorber assembly and/or the rear right shock absorber assembly. Furthermore, in the illustrated embodiment, the second end 124 of the lateral tie rod 120 (e.g., the end coupled to the brace 118) is positioned closer to the vertical centerline 68 than the first end 122 (e.g., the end coupled to the chassis) along the lateral axis 28. Accordingly, the second end 124 of the lateral tie rod 120 is positioned more laterally inward than the first end 122. In alternative embodiments, the first end 122 may be coupled to the first tower support. Furthermore, in alternative embodiments, the first end of the tie rod may be positioned more laterally inward than the second end.

To facilitate discussion and illustration of the longitudinal tie rod 121, the support plate 127 is illustrated as a transparent member. As discussed in detail below, the longitudinal tie rod 121 extends between the cab 12 and the chassis 14 along the longitudinal axis 26. The first end 123 of the longitudinal tie rod 121 is rotatably coupled to the cab 12 and the second end 125 of the longitudinal tie rod 121 is rotatably coupled to the chassis 14. In the illustrated embodiment, the second end 125 of the longitudinal tie rod 121 is rotatably coupled to two tabs 129 extending from the support plate 127. As illustrated, the two tabs 129 extend out from the support plate 127 and include respective thru-holes configured to receive a fastener 161. The fastener 161 rotatably couples the second end 125 of the longitudinal tie rod 121 to the two tabs 129. In some embodiments, the fastener 161 may be threaded to receive a nut 165 (e.g., or threaded washer, pin, fastener, etc.). Although two tabs 129 are included on the support plate 127, in alternative embodiments, 1, 3, 4, 6, or any suitable number of tabs may extend from the support plate.

In alternative embodiments, the second end of the longitudinal tie rod may be coupled to another portion of the chassis 14 (e.g., such as directly to the support plate 127 to one of the tower supports, etc.). Although the rear suspension assembly of the illustrated embodiment includes one longitudinal tie rod 121, in alternative embodiments, the rear suspension assembly may include 2, 3, 4, or any other suitable number of longitudinal tie rods. For example, the rear suspension system may include one longitudinal tie rod positioned left of the vertical centerline 68 and another longitudinal tie rod positioned to the right of the vertical centerline 68, such that both longitudinal tie rods are oriented along the longitudinal axis (e.g., substantially parallel to one another) and/or equally spaced away from the centerline 68.

Furthermore, the lateral tie rod 120 is configured to substantially reduce movement of the cab 12 relative to the chassis 14 along the lateral axis 28. In addition, the lateral tie rod 120 is configured to substantially reduce rotation of the cab 12 about the vertical axis 24 in yaw 34. The lateral tie rod 120 may enable movement of the cab 12 along the vertical axis 24. The shock absorbers of the shock absorber assemblies may reduce energy transfer between the chassis and the cab along the vertical axis 24. As a result of the arrangement of the shock absorber assemblies, the brace, and the lateral and longitudinal tie rod, the rear suspension assembly may significantly increase operator comfort, as compared to work vehicles that only include a resilient isolator at the rear connection between the cab and the chassis.

As previously discussed, the top end 132 of the rear left shock absorber assembly 116 and the top end 144 of the rear right shock absorber assembly 130 are configured to be decoupled from the cab 12 without decoupling the brace 118 from the top end 132 of the rear left shock absorber assembly 116 and the top end 144 of the rear right shock absorber assembly 130. To decouple the rear end of the cab 12 from the chassis 14, the first fastener 140 may be removed from the top end 132 of the rear left shock absorber assembly 116, and the second fastener 150 may be removed from the top end 144 of the rear right shock absorber assembly 130. Removing the first and second fasteners enables the cab to be rotated forwardly about the pivot joints, thereby facilitating access to components housed within or coupled to the chassis. However, because the third fastener 158 remains coupled to the top end 132 of the rear left shock absorber assembly 116, and the fourth fastener 160 remains coupled to the top end 144 of the rear right shock absorber assembly 130, the brace 118 remains coupled to the top end 132 of the rear left shock absorber assembly 116 and to the top end 144 of the rear right shock absorber assembly 130. Accordingly, the shock absorber assemblies, the brace, and the tie rod remain coupled to the chassis while the cab is rotated toward the maintenance position.

Figure 8:
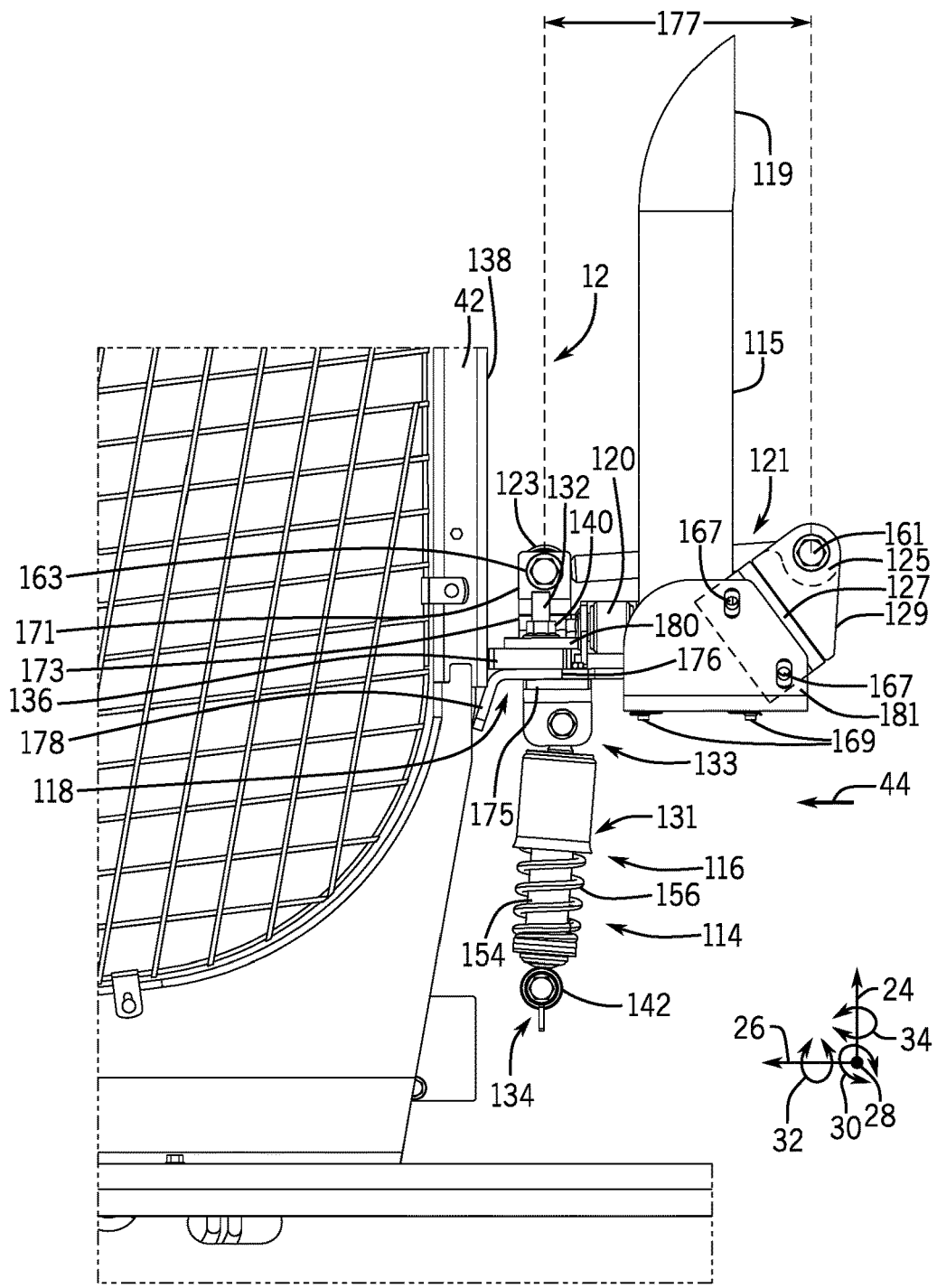
FIG. 8 is a side view of the rear suspension assembly of FIG. 6.

FIG. 8 is a side view of the rear suspension assembly 114 of FIG. 6. As illustrated, the first mount 136 extends rearwardly from the rear face 138 of the frame 42 of the cab 12 relative to the direction of travel 44. The second mount also extends rearwardly from the rear face of the frame of the cab relative to the direction of travel. In the illustrated embodiment, the brace 118 is disposed between the first mount 136 and a mounting portion 175 (e.g., a bracket of the mounting assembly, a spacer disposed on a bracket of the mounting assembly, etc.) of the rear left shock absorber assembly 116. In addition, the brace is disposed between the second mount and a mounting portion (e.g., a bracket of the mounting assembly, a spacer disposed on a bracket of the mounting assembly, etc.) of the rear right shock absorber assembly. As previously discussed, the brace 118 is coupled to each shock absorber assembly by a respective fastener. In the illustrated embodiment, the brace 118 includes a first portion 176 disposed between the mounts and the mounting portions of the respective shock absorber assemblies, and a second portion 178 positioned forward of the first portion 176 along the longitudinal axis 26 relative to the direction of travel 44. The second portion 178 of the brace 118 is configured to contact the frame 42 of the cab 12 to facilitate alignment of the mounts with the top ends of the respective shock absorber assemblies (e.g., while the cab 12 is in the working position).

As previously discussed, the top end 132 (e.g., the top end of the mounting assembly) of the rear left shock absorber assembly 116 is selectively coupled to the first mount 136 by the first fastener 140, and the top end (e.g., the top end of the mounting assembly) of the rear right shock absorber assembly is selectively coupled to the second mount by the second fastener. In the illustrated embodiment, a first washer 180 is disposed between the first fastener 140 and the first mount 136. In addition, a second washer is disposed between the second fastener and the second mount. The washers are configured to distribute the force applied by the fasteners across a larger area of the respective mounts. While the illustrated embodiment includes washers disposed between the fasteners and the mounts, it should be appreciated that in alternative embodiments, at least one of the washers may be omitted.

As mentioned above, the rear suspension assembly 114 includes a longitudinal tie rod 121 oriented substantially along the direction of travel 44 (e.g., along the longitudinal axis 26). As illustrated, the longitudinal tie rod 121 has a fixed longitudinal length 177 (e.g., the longitudinal tie rod 121 is a single segment) from the first end 123 to the second end 125. In alternative embodiments, the length of the longitudinal tie rod may be adjustable (e.g., via rotation of fasteners that coupe segments of the longitudinal tie rod to one another). The first end 123 of the longitudinal tie rod 121 is rotatably coupled to a first mounting bracket 171 that is rigidly fixed to a second mounting bracket 173, and the second mounting bracket is rigidly fixed to the brace 118. More specifically, the first end of the longitudinal tie rod 121 is rotatably coupled to the first mounting bracket 171 via the fastener 161. Furthermore, the first mounting bracket 171 may be welded, riveted, or coupled via fasteners, among other suitable rigid fixing systems, to the second mounting bracket 173. The second mounting bracket 173 may also be welded, riveted, or coupled via fasteners, among other suitable rigid fixing systems, to the brace 118. In addition, in the illustrated embodiment, the second end 125 of the longitudinal tie rod 121 is rotatably coupled to the two tabs 129. In the illustrated embodiment, the two tabs 129 may extend orthogonally outward from the support plate 127 and include thru holes configured to receive the fastener 163 that rotatably couples the second end 125 of the longitudinal tie rod 121 to the support plate 127.

Furthermore, in the illustrated embodiment, the chassis 14 includes an L-shaped bracket 181 that include two opening on a lateral side, and the two openings are each configured to receive a respective fastener 167 configured to rigidly fix the support plate 127 to the L-shaped bracket 181. The L-shaped bracket 181 also includes openings on an underside, and the openings are configured to receive fasteners 169 that couple the L-shaped bracket 181 to the chassis 14. In some embodiments, the L-shaped bracket 181 may be configured to couple to the brace 118. Furthermore, the underside of the L-shaped bracket 181 may include an aperture that is substantially equal in size and shape to the opening on the first side of the exhaust pipe 115.

The longitudinal tie rod 121 is configured to substantially reduce movement of the cab 12 relative to the chassis 14 along the longitudinal axis 26. Collectively, the first and longitudinal tie rods may enable movement of the cab 12 along the vertical axis 24, while substantially blocking rotation of the cab 12 about the vertical axis 24 in yaw 34 and about the lateral axis 28 in pitch 30. The shock absorbers of the shock absorber assemblies may reduce energy transfer between the chassis and the cab along the vertical axis 24, as discussed below with regards to FIG. 12. As a result of the arrangement of the shock absorber assemblies, the brace, and the lateral and longitudinal tie rods, the rear suspension assembly may significantly increase operator comfort, for example, as compared to work vehicles that only include a resilient isolator at the rear connection between the cab and the chassis. In some embodiments, occupant comfort may be further enhanced because the longitudinal tie rod 121 and the support element 46 together block rotation about the vertical axis 24 in yaw 34.

Figure 9:
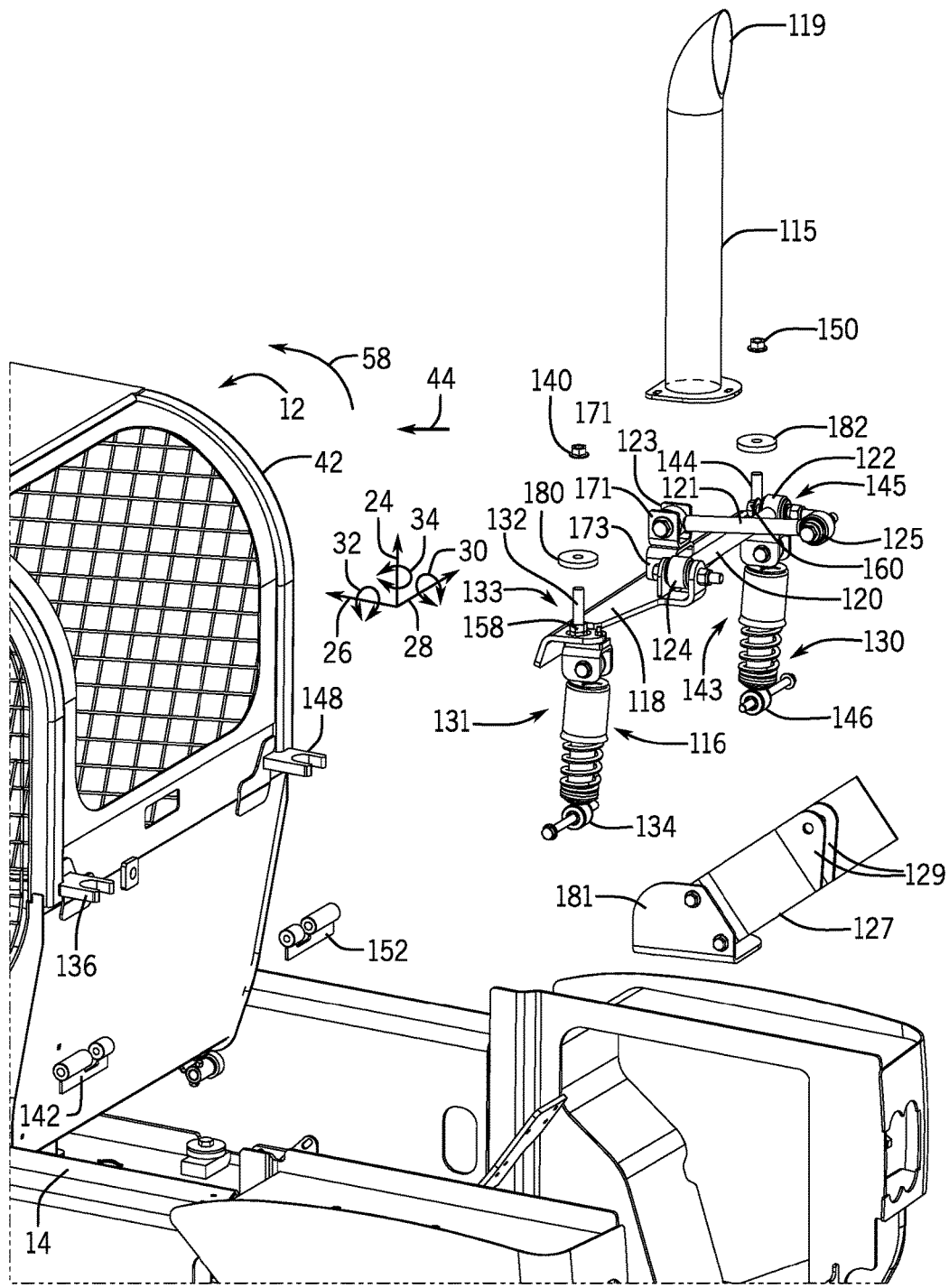
FIG. 9 is an exploded view of the rear suspension assembly of FIG. 6.

FIG. 9 is an exploded view of the rear suspension assembly 114 of FIG. 6. In the illustrated embodiment, the top end 132 (e.g., the top end of the mounting assembly) of the rear left shock absorber assembly 116 is selectively coupled to the first mount 136 of the cab 12 via the washer 180 and the first fastener 140. In addition, the bottom end 134 (e.g., the bottom end of the shock absorber) of the rear left shock absorber assembly 116 is coupled to the first support 142 of the chassis 14. Furthermore, the top end 144 (e.g., the top end of the mounting assembly) of the rear right shock absorber assembly 130 is selectively coupled to the second mount 148 of the cab 12 via the second washer 182 and the second fastener 150. The bottom end 146 (e.g., the bottom end of the shock absorber) of the rear right shock absorber assembly 130 is coupled to the second support 152 of the chassis 14. In addition, the brace 118 is coupled to the top end 132 of the rear left shock absorber assembly 116 via the third fastener 158 and to the top end 144 of the rear right shock absorber assembly 130 via the fourth fastener 160. Furthermore, the first end 122 of the lateral tie rod 120 is coupled to the chassis 14, and the second end 124 of the lateral tie rod 120 is coupled to the brace 118. As described in detail above, the first end 123 of the longitudinal tie rod 121 is rotatably coupled to the first mounting bracket 171, which is rigidly fixed to the second mounting bracket 173, which is rigidly fixed to the brace 118. Furthermore, the second end 125 is rotatably coupled to the two tabs 129 extending from the support plate 127. To rotate the cab 12 from the illustrated working position to the maintenance position, the first fastener 140 and the first washer 180 may be removed from the top end 132 of the rear left shock absorber assembly 116, and the second fastener 150 and the second washer 182 may be removed from the top end 144 of the rear right shock absorber assembly 130. The cab 12 may then be rotated forwardly in the direction 58, while the lateral tie rod 120, the longitudinal tie rod 121, the support plate 127, the brace 118, the L-shaped bracket 181, and the shock absorber assemblies remain coupled to the chassis 14.

While the cab 12 is coupled to the shock absorber assemblies, the shock absorbers of the shock absorber assemblies may absorb energy associated with movement/vibrations of cab 12. For example, when the work vehicle (e.g., at least one rear wheel of the work vehicle) encounters a protrusion on the ground (e.g., bump, ridge, etc.), the rear of the cab may be urged downwardly relative to the chassis. As a result, the shock absorbers may compress, thereby absorbing energy associated with the encounter. Accordingly, the energy transfer between the chassis 14 and the cab 12 may be reduced, thereby enhancing passenger comfort. In addition, when the work vehicle (e.g., at least one rear wheel of the work vehicle) encounters a recess in the ground (e.g., trench, divot, etc.), the rear of the cab 12 may be urged upwardly relative to the chassis 14. As a result, the shock absorbers may expand, thereby absorbing energy associated with the encounter. Accordingly, the energy transfer between the chassis 14 and the cab 12 may be reduced, thereby enhancing passenger comfort.

Figure 10:
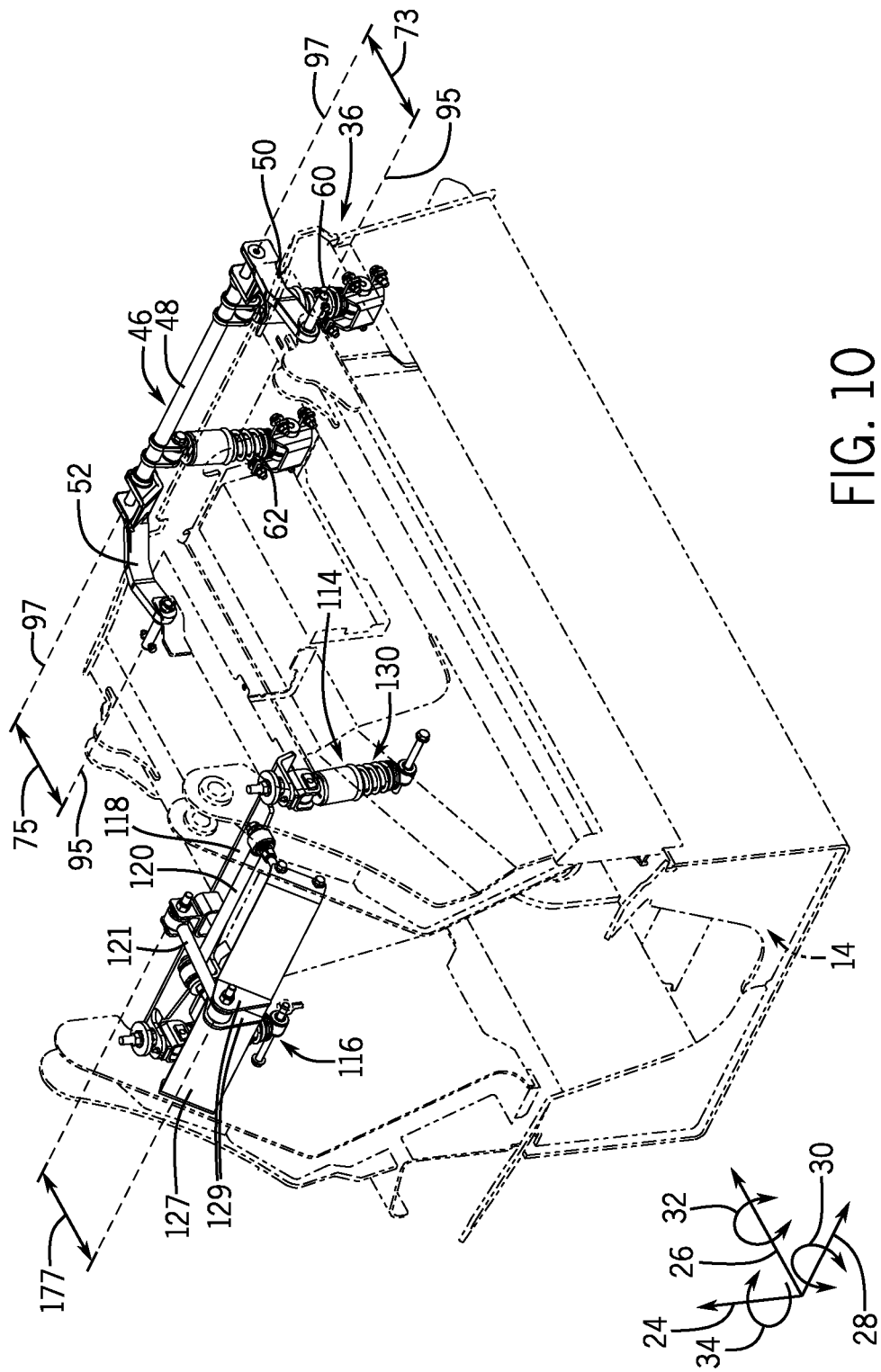
FIG. 10 is a perspective view of the front suspension assembly of FIG. 2 and the rear suspension assembly of FIG. 6.

FIG. 10 is a perspective view of the work vehicle that may include the front suspension assembly 36 of FIG. 2 and the rear suspension assembly 114 of FIG. 6. In the illustrated embodiment, the front suspension assembly 36 includes the support element 46 having the torsion bar 48 and the pair of longitudinal supports, such as the illustrated first longitudinal support 50 and the second longitudinal support 52. As illustrated, the torsion bar 48 extends between the pair of longitudinal supports substantially along the lateral axis 28. The first longitudinal support 50 and the second longitudinal support 52 are each rotatably coupled to the chassis 14 of the work vehicle. In the illustrated embodiment, the front suspension assembly 36 includes the damping assembly 59 having the front right (e.g., first) shock absorber 60 and the front left (e.g., second) shock absorber 62.

Furthermore, in the illustrated embodiment, the rear suspension assembly 114 includes the rear left (e.g., first) shock absorber assembly 116 and the rear right (e.g., second) shock absorber assembly 130. Each shock absorber assembly has a top (e.g., first) end configured to be coupled to the cab 12 of the work vehicle and a bottom (e.g., second) end coupled to the chassis 14 of the work vehicle. In addition, the rear suspension assembly 114 includes a brace 118 extending along the lateral axis 28 (e.g., lateral relative to the direction of travel 44) between the top end of the rear left shock absorber assembly 116 and the top end of the rear right shock absorber assembly 130. Furthermore, the rear suspension assembly 114 includes the lateral tie rod 120, which is substantially oriented along the lateral axis 28. As mentioned above, the lateral tie rod 120 has a first end rotatably coupled to the chassis 14 and a second end rotatably coupled to the brace 118. In addition, the rear suspension assembly 114 includes the longitudinal tie rod 121, which has a first end rotatably coupled to the brace 118 and a second end rotatably coupled to two tabs 129 extending outwardly from the support plate 127 of the chassis 14.

In the illustrated embodiment, the support element 46 of the front suspension assembly 36, and the longitudinal tie rod 121 of the rear suspension assembly 114 collectively form a four-bar link articulation between the cab 12 and the chassis 14, which substantially reduces rotation of the cab 12 relative to the chassis 14 about the longitudinal axis 26 in roll 32. In some embodiments, the length of the longitudinal tie rod 121 and the lengths of the first and second longitudinal supports 50 and 52 are the same length to facilitate a four-bar link articulation, thereby restricting the motion of the cab 12 relative to the chassis 14 to along the vertical axis 24. Furthermore, in some embodiments, the orientation (e.g., axle angle) of the longitudinal tie rod 121 is equal to the orientation (e.g., axle angle) of the first and second longitudinal supports 50 and 52 to further enable the four-bar link articulation. In some embodiments, when the longitudinal length 177 is equal to the lengths 73 and 75, the motion of the cab 12 relative to the chassis 14 may be restricted to along the vertical axis 24. The four-bar linkage enables movement of the cab 12 relative the chassis 14 along the vertical axis 24, while blocking rotation about the lateral axis 28, thereby increasing operator comfort.

Figure 11:
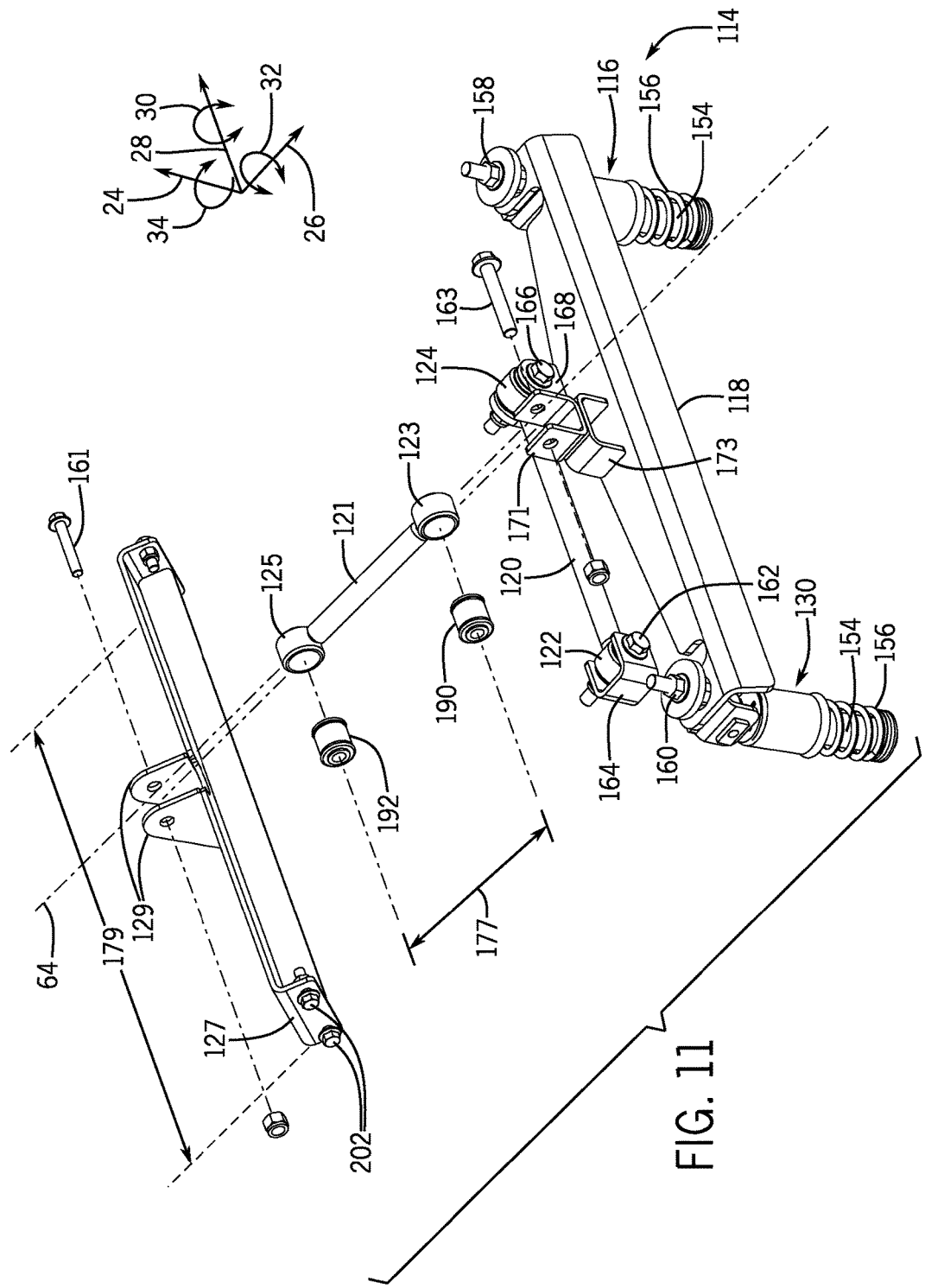
FIG. 11 is an exploded view of a portion of the rear suspension assembly of FIG. 6.

FIG. 11 is an exploded view of a portion of the rear suspension assembly of FIG. 6. As discussed in detail above, the rear suspension assembly 114 includes the rear left shock absorber assembly 116 and the rear right shock absorber assembly 130, and each shock absorber assembly includes a respective damper 154 and a spring 156. As illustrated, the brace 118 extends along the lateral axis 28 between the top end of the rear left shock absorber assembly 116 and the top end of the rear right shock absorber assembly 130. The top end of the rear left shock absorber assembly 116 (e.g., the top end of the mounting assembly) is coupled to the brace 118 by the third fastener 158, and the top end of the rear right shock absorber assembly 130 is coupled to the brace 118 by the fourth fastener 160.

Furthermore, in the illustrated embodiment, the first end 122 of the lateral tie rod 120 is coupled via the fastener 162 to the mount 164 that is rigidly coupled to the laterally inward side of the first tower support of the chassis. As illustrated, the first end 122 of the lateral tie rod 120 and the mount 164 include respective openings that may align to receive the fastener 162, thereby rotatably coupling the first end 122 of the lateral tie rod 120 to the mount 164. Furthermore, the second end 124 of the lateral tie rod 120 is coupled via a fastener 166 to a tab 168 that extends from the brace 118. In alternative embodiments, the tab 168 may be rigidly fixed to the brace 118 via welding, riveting, or any other suitable coupling system. As illustrated, the second end 124 of the lateral tie rod 120 and the tab 168 include openings that may receive the fastener 166, thereby rotatably coupling the second end 124 of the lateral tie rod 120 to the tab 168. In some embodiments, the fasteners may be threaded and configured to receive nuts that secure the fasteners to their respective components.

As mentioned above, the second mounting bracket 173 is rigidly fixed to the brace 118 via any suitable system (e.g., welding, riveting). As illustrated, the second mounting bracket 173 is positioned on the brace 118 such that the second mounting bracket 173 is laterally centered on the longitudinal centerline 64, thereby positioning the longitudinal tie rod 121 along the centerline 64. In some embodiments, the longitudinal tie rod 121 has a longitudinal length 177 that is equal to a distance between the openings corresponding to the tabs 129 and the openings corresponding to the first mounting bracket 171. In another exemplary embodiment, the longitudinal length 177 is equal to the distance 71 (e.g., the distance 71 is the distance between the first longitudinal support 50 and the second longitudinal support 52 illustrated in FIG. 5). In yet another exemplary embodiment, the longitudinal length 177 may be equal to the length 170 (e.g., the length 170 is the length of the lateral tie rod 120 illustrated in FIG. 7). In still another exemplary embodiment, the longitudinal length 177 may be equal to the length 73 of the first longitudinal support 50 or the length 75 of the second longitudinal support 52, such that a four-bar link articulation is enabled to restrict movement of the cab 12 relative to the chassis 14 to along the vertical axis 24.

In some embodiments, the first mounting bracket 171 is rigidly fixed to the second mounting bracket 173 via any suitable system (e.g., riveting, welding, etc.). As illustrated, the first mounting bracket 171 includes two openings on opposite lateral sides, and the two openings may align with an opening on the first end 123 of the longitudinal tie rod 121 to facilitate reception of the fastener 163. As such, the first end 123 of the longitudinal tie rod 121 may rotatably couple with to the first mounting bracket with the fastener 163. In addition, the first end 123 of the longitudinal tie rod 121 includes an opening configured to receive a bushing 190 and the second end 125 of the longitudinal tie rod 121 includes a bushing 192. Furthermore, the bushing 190 includes an opening configured to receive the fastener 163 and the bushing 192 includes an opening configured to receive fastener 161.

Furthermore, in the illustrated embodiment, the support plate 127 is oriented along the lateral axis 28 and configured to couple the longitudinal tie rod 121 to the chassis 14. A set of fasteners 202 is configured to couple the support plate 127 to the corresponding tower supports (e.g., the first tower support and the second tower support). For example, the support plate 127 may have a length 179 that is substantially equal to the lateral distance between the tower supports. Two tabs 129 extend from the support plate 127. Each tab 129 includes a respective opening that aligns with the opening at the second end 125 of the longitudinal tie rod 121. Furthermore, the openings on the two tabs 129 are configured to receive the fastener 163 to rotatably couple the longitudinal tie rod 121 to the support plate 127. Although in the illustrated embodiment, the support plate 127 extends between the first and second tower supports, in alternative embodiments, the support plate may be shorter or longer in length. For example, the support plate 127 may only be coupled to the second tower support 128 and have a shorter length. In alternative embodiments, the support plate 127 may be omitted, and the two tabs 129 may couple directly to the chassis 14. Furthermore, in the illustrated embodiment, the support plate 127 is oriented between 30 degrees and 60 degrees about the longitudinal axis 26 relative to a ground plane, but in alternative embodiments, the support plate may be oriented at any suitable angle relative to the ground plane. Furthermore, in some embodiments, the longitudinal tie rod 121 may be positioned left or right of the centerline 64. It should be noted that in some embodiments, the longitudinal tie rod 121 may be split into two smaller tie rods with the same length and orientations as the first and second longitudinal supports 50 and 52. The two smaller tie rods may be connected to a respective tower support (e.g., first tower support 126 and the second tower support 128). In some embodiments, the two small tie rods would not be connected to the support plate 127.

Figure 12:
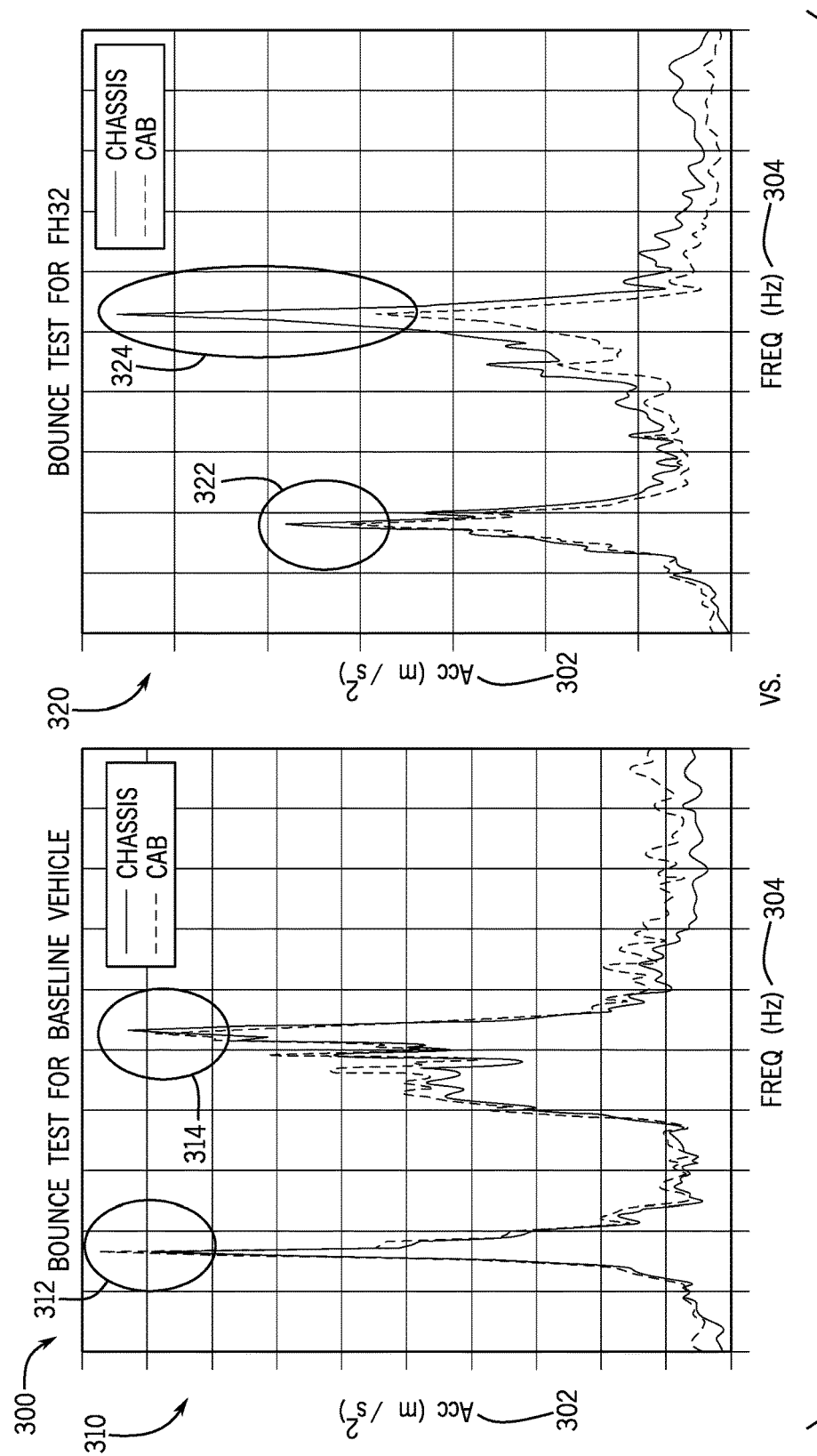
FIG. 12 is a plot of a bounce test including vibrations of a work vehicle that employs the rear suspension assembly of FIG. 6 and vibrations of a work vehicle that does not employ the rear suspension assembly of FIG. 6.

FIG. 12 depicts a plot 300 of a bounce test including vibrations of a work vehicle 10 that employs the rear suspension assembly 114 of FIG. 6 and vibrations of a work vehicle that does not employ the rear suspension assembly of FIG. 6. In the illustrated embodiment, a first subplot 310 that plots the acceleration 302 in meters per second squared (m/s$^2$) against the frequency 304 in hertz (Hz) for the work vehicle that does not employ the rear suspension assembly of FIG. 6, hereinafter called "baseline vehicle." Furthermore, in the illustrated embodiment, a second subplot 320 includes the acceleration 302 in m/s$^2$ against the frequency 304 in Hz for the work vehicle 10 that employs the rear suspension assembly 114 of FIG. 6. Both the first subplot 310 and the second subplot 320 include a solid line depicting the acceleration against the frequency for the chassis 14 and a dashed line depicting the acceleration against the frequency for the cab 12.

In the depicted embodiments, the first subplot 310 includes vibration data associated with the chassis and cab, respectively, having a first local maximum 312 at 3.5 Hz and a second local maximum 314 at 10.6 Hz. The second subplot 320 includes vibration data associated with the chassis 14 and cab 12, respectively, having a first local maxim 322 at 3.5 Hz and a second local maximum 314 at 10.6 Hz. In comparison to the first subplot 310, the second subplot 320 has a lower cab acceleration at the first local maximum 322 and the second local maximum 324. As a result, in some embodiments, the shock absorbers of the shock absorber assemblies may reduce energy transfer between the chassis 14 and the cab 12 along the vertical axis 24. As a result of the arrangement of the shock absorber assemblies, the brace, and the lateral and longitudinal tie rods, the rear suspension assembly may significantly increase operator comfort, for example, as compared to work vehicles that only include a resilient isolator at the rear connection between the cab and the chassis.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A rear suspension assembly, comprising:
a first shock absorber assembly and a second shock absorber assembly, wherein each of the first and second shock absorber assemblies has a first end configured to couple to a cab of the work vehicle and a second end configured to couple to a chassis of the work vehicle;
a brace extending laterally between the first end of the first shock absorber assembly and the first end of the second shock absorber assembly relative to a direction of travel of the work vehicle, wherein the first end of the first shock absorber assembly and the first end of the second shock absorber assembly are coupled to the brace; and
a longitudinal tie rod oriented substantially longitudinally along the direction of travel of the work vehicle, wherein the longitudinal tie rod has a first end rotatably coupled to the brace and a second end configured to rotatably couple to the chassis of the work vehicle;
wherein the first end of the first shock absorber assembly and the first end of the second shock absorber assembly are configured to be decoupled from the cab without decoupling the brace from the first end of the first shock absorber assembly and the first end of the second shock absorber assembly.

2. The suspension assembly of claim 1, wherein at least one of the first and second shock absorber assemblies includes a shock absorber having a damper, a spring, or a combination thereof.

3. The suspension assembly of claim 1, wherein the rear suspension assembly comprises a first fastener configured to selectively couple the first end of the first shock absorber assembly to the cab and a second fastener configured to selectively couple the first end of the second shock absorber assembly to the cab.

4. The suspension assembly of claim 1, wherein the first end of the first shock absorber assembly is coupled to the brace with a third fastener, and the first end of the second shock absorber assembly is coupled to the brace with a fourth fastener.

5. The suspension assembly of claim 1, wherein each of the first and second shock absorber assemblies is configured to be disposed within a respective tower support of the chassis.

6. The suspension assembly of claim 1, wherein the longitudinal tie rod is positioned substantially along a longitudinal centerline, and the longitudinal centerline is positioned, substantially laterally equidistant from the first shock absorber assembly and the second shock absorber assembly.

7. The suspension assembly of claim 1, wherein the longitudinal tie rod is positioned behind the cab relative to the direction of travel.

8. The suspension assembly of claim 1, wherein the first end of the longitudinal tie rod is rotatably coupled to the brace via a mounting bracket, the second end of the longitudinal tie rod is rotatably coupled to at least one tab extending from a support plate, and the support plate is configured to be coupled to the chassis.

9. The suspension assembly of claim 8, wherein the support plate is configured to be rigidly coupled to at least one tower support of the chassis.

10. A rear suspension assembly, comprising:
a first shock absorber assembly and a second shock absorber assembly, wherein each of the first and second shock absorber assemblies has a first end configured to couple to a cab of the work vehicle and a second end configured to couple to a chassis of the work vehicle;
a brace extending laterally between the first end of the first shock absorber assembly and the first end of the second shock absorber assembly relative to a direction of travel of the work vehicle, wherein the first end of the first shock absorber assembly and the first end of the second shock absorber assembly are coupled to the brace;
a lateral tie rod oriented substantially laterally relative to the direction of travel of the work vehicle, wherein the lateral tie rod has a first end configured to rotatably couple to the chassis of the work vehicle and a second end rotatably coupled to the brace;
a first fastener configured to selectively couple the first end of the first shock absorber assembly to the cab; and
a second fastener configured to selectively couple the first end of the second shock absorber assembly to the cab
wherein the first end of the first shock absorber assembly and the first end of the second shock absorber assembly are configured to be decoupled from the cab without decoupling the brace from the first end of the first shock absorber assembly and the first end of the second shock absorber assembly.

11. The suspension assembly of claim 10, further comprising a first fastener configured to rotatably couple the first end of the lateral tie rod to a tower support of the chassis, and a second fastener configured to rotatably couple the second end of the lateral tie rod to the brace.

12. The suspension assembly of claim 10, wherein the lateral tie rod is positioned laterally inward from the first shock absorber assembly and from the second shock absorber assembly.

13. The suspension assembly of claim 10, wherein the lateral tie rod is positioned behind the cab relative to the direction of travel.

14. A rear suspension assembly, comprising:
a first shock absorber assembly and a second shock absorber assembly, wherein each of the first and second shock absorber assemblies has a first end configured to couple to a cab of the work vehicle and a second end configured to couple to a chassis of the work vehicle;
a brace extending laterally between the first end of the first shock absorber assembly and the first end of the second shock absorber assembly relative to a direction of travel of the work vehicle, wherein the first end of the first shock absorber assembly and the first end of the second shock absorber assembly are coupled to the brace;
a lateral tie rod oriented substantially laterally relative to the direction of travel of the work vehicle, wherein the lateral tie rod has a first end configured to rotatably couple to the chassis of the work vehicle and a second end rotatably coupled to the brace; and
a longitudinal tie rod oriented substantially longitudinally along the direction of travel of the work vehicle, wherein the longitudinal tie rod has a first end configured to rotatably couple to the cab of the work vehicle and a second end configured to rotatably couple to the chassis of the work vehicle;
wherein the first end of the first shock absorber assembly and the first end of the second shock absorber assembly are configured to be decoupled from the cab without decoupling the brace from the first end of the first shock absorber assembly and the first end of the second shock absorber assembly.

15. The suspension assembly of claim 14, wherein the first end of the first shock absorber assembly and the first end of the second shock absorber assembly are configured to be decoupled from the cab without decoupling the brace from the first end of the first shock absorber assembly and the first end of the second shock absorber assembly.

16. The suspension assembly of claim 15, wherein the lateral tie rod is oriented perpendicular to the longitudinal tie rod.

17. The suspension assembly of claim 14, wherein the first end of the longitudinal tie rod is rotatably coupled to the brace via a mounting bracket, the second end of the longitudinal tie rod is rotatably coupled to at least one tab extending from a support plate, and the support plate is configured to be coupled to the chassis.

18. The suspension assembly of claim 17, wherein the support plate is oriented longitudinally oriented laterally inward from a first tower support and a second tower support, wherein the first tower support encloses the first shock absorber and the second tower support encloses the second shock absorber.

19. A suspension system, comprising:
a front suspension assembly, comprising:
at least one bracket configured to fixedly couple to a frame of the cab of the work vehicle, wherein the at least one bracket is configured to extend forwardly from a front face of the frame relative to the direction of travel;
a support element having a torsion bar and a pair of longitudinal supports, wherein the torsion bar extends laterally between the pair of longitudinal supports, and each of the pair of longitudinal supports is configured to rotatably couple to the chassis of the work vehicle; and a damping assembly coupled to the support element and configured to couple to the chassis;

wherein the at least one bracket is rotatably coupled to the support element at a pivot joint assembly, and the at least one bracket is configured to position the pivot joint assembly forward of the cab relative to the direction of travel while the at least one bracket is coupled to the frame of the cab; and the rear suspension assembly of claim 14.

\* \* \* \* \*